US007093638B2

(12) United States Patent
Bonaventura

(10) Patent No.: US 7,093,638 B2
(45) Date of Patent: Aug. 22, 2006

(54) APPARATUS AND METHOD FOR MANUFACTURE AND USE OF COMPOSITE FIBER COMPONENTS

(75) Inventor: Michael Bonaventura, St. Louis, MO (US)

(73) Assignee: Lignum Vitae Limited, Nassau (BS)

( * ) Notice: Subject to any disclaimer, the term of this patent is extended or adjusted under 35 U.S.C. 154(b) by 0 days.

(21) Appl. No.: 10/828,237

(22) Filed: Apr. 21, 2004

(65) Prior Publication Data

US 2005/0037195 A1 Feb. 17, 2005

Related U.S. Application Data

(60) Provisional application No. 60/549,787, provisional application No. 60/504,387, filed on Sep. 20, 2003, provisional application No. 60/464,168, filed on Apr. 21, 2003.

(51) Int. Cl.
*B65H 81/00* (2006.01)

(52) U.S. Cl. ............... 156/351; 156/356; 156/361; 156/367; 156/368; 156/441; 156/524

(58) Field of Classification Search ........... 156/315, 156/356, 361, 367, 368, 441, 524, 525; 264/257, 264/258, 261; 425/122
See application file for complete search history.

(56) References Cited

U.S. PATENT DOCUMENTS 4,445,957 A * 5/1984 Harvey .................. 156/180
4,699,683 A * 10/1987 McCowin ............... 156/353
5,022,952 A * 6/1991 Vaniglia ................. 156/441
5,266,139 A * 11/1993 Yokota et al. ............ 156/169
6,048,427 A * 4/2000 Gauchel et al. .......... 156/180
2004/0144478 A1* 7/2004 Green .................... 156/161

* cited by examiner

*Primary Examiner*—George Koch
(74) *Attorney, Agent, or Firm*—Pillsbury Winthrop Shaw Pittman, LLP

(57) ABSTRACT

A fiber lay-up apparatus and method includes one or more fiber sources from at least one fiber supply wherein a fiber may be fed under tension to provide a pre-stress to the fiber. The fiber lay-up apparatus may include a resin impregnator for impregnating a fiber with a resin. The fiber may be impregnated under pressure to reduce friction, to provide a motive force to move the fiber through the impregnator, or to enhance control over impregnation. The fiber may be shaped by a fiber shaping unit including one or more active or passive shaping members that provide enhanced control over the shape and placement of the fiber as the fiber leaves the fiber lay-up apparatus. A cutting element for cutting a fiber as it is being layed-up may be positioned proximal to the one or more shaping members, and may enable the fiber lay-up apparatus to end the lay-up of one fiber (or set of fibers) and begin the lay-up of a new fiber (or set of fibers) without delay. A UV or other curing element may be provided downstream from the cutting element. A splicing unit may be employed to detect when a fiber supply is exhausted, and may splice a trailing end of an exhausted fiber supply to a leading end of a new fiber supply to provide a continuous (or substantially continuous) fiber feed. The splicing unit may also splice at least one sensor into a fiber being fed from the at least one fiber supply to provide information about the fiber either before, during, or after the fiber is layed-up.

13 Claims, 28 Drawing Sheets

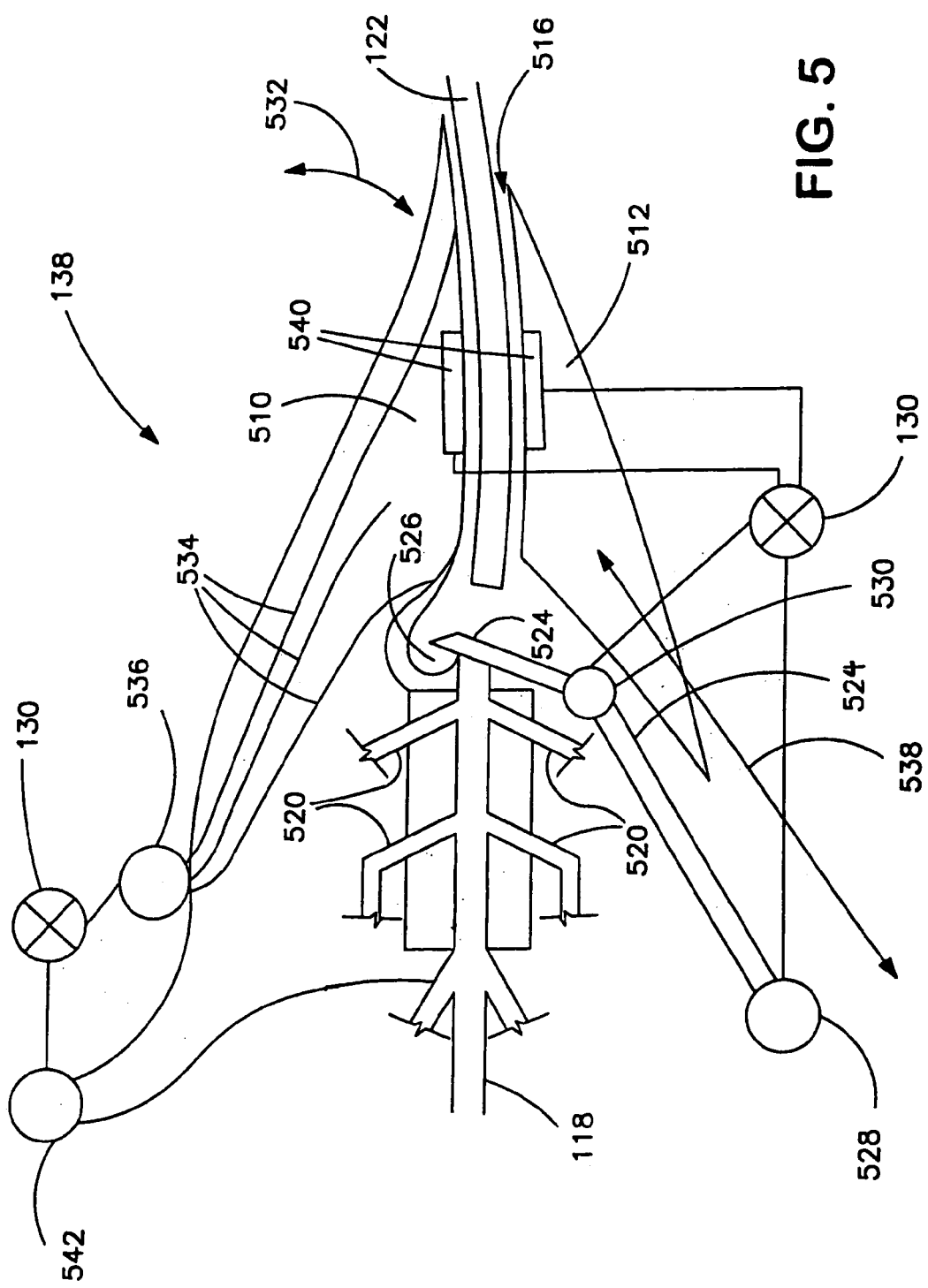

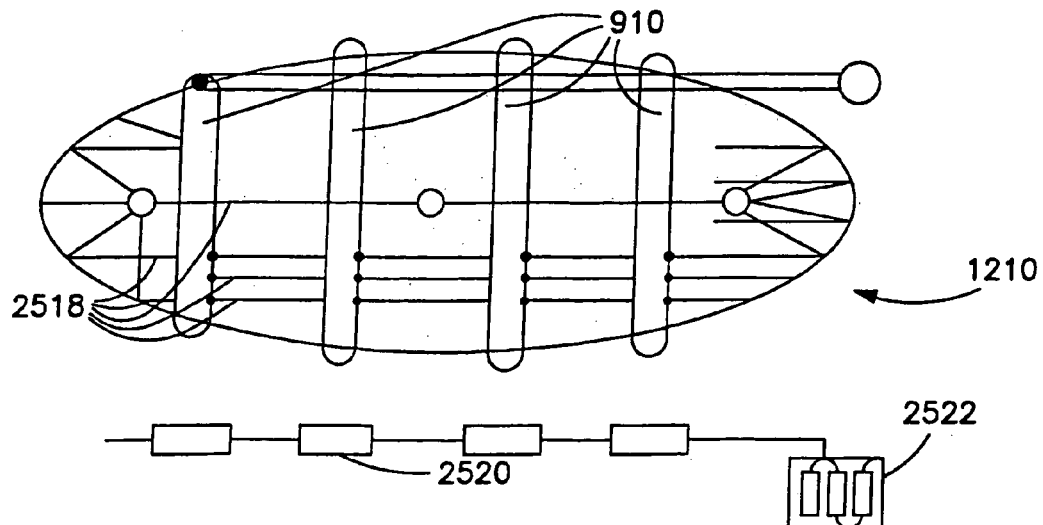
FIG. 25A
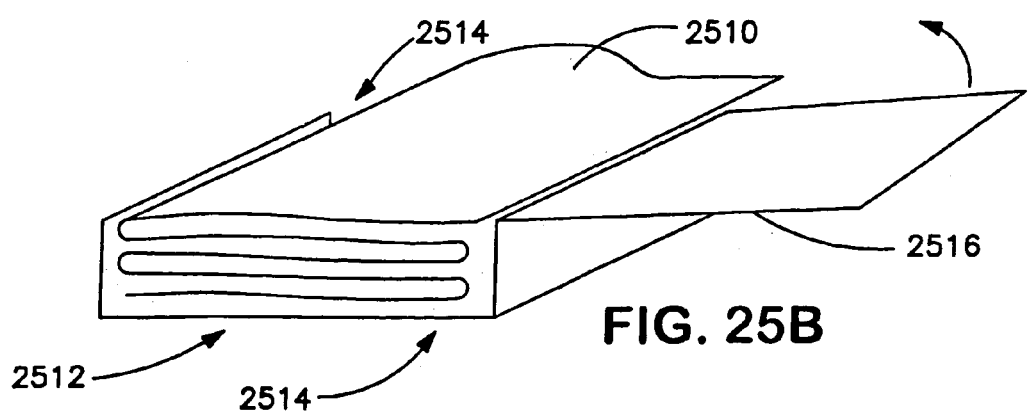
FIG. 25B
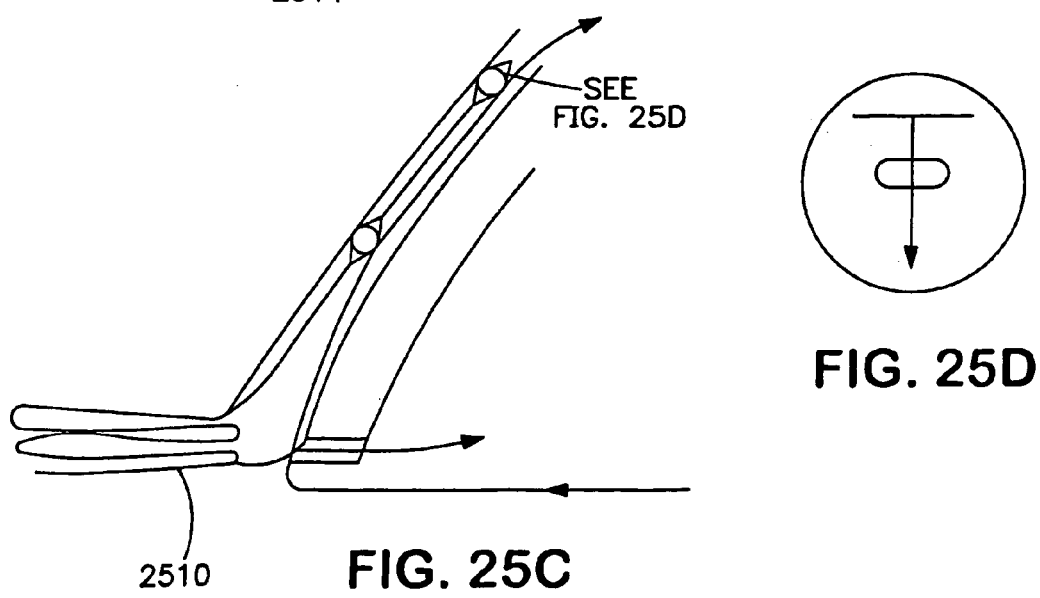
FIG. 25C
FIG. 25D

APPARATUS AND METHOD FOR MANUFACTURE AND USE OF COMPOSITE FIBER COMPONENTS

CROSS-REFERENCE TO RELATED APPLICATIONS

This Application claims priority to the following U.S. Provisional Patent Applications, each of which are incorporated herein by reference in their entirety: U.S. Provisional Patent Application Ser. No. 60/549,767, filed Mar. 4, 2004, by inventor Michael Bonaventura Warek, entitled "Tension Truss, oblique prestressed structural elements;" U.S. Provisional Patent Application Ser. No. 60/504,387, filed Sep. 20, 2003; and U.S. Provisional Patent Application Ser. No. 60/464,168, filed Apr. 21, 2003.

FIELD OF THE INVENTION

The invention relates to methods and apparatus for manufacture and use of composite fiber components.

BACKGROUND OF THE INVENTION

Apparatus and methods for manufacture and use of composite fibers in general are known. Many drawbacks exist with the known apparatus and methods.

In recent years, many industries including, but not limited to, the aerospace, automotive, marine, wind energy systems, furniture, telecommunications, transportation, residential construction, architectural applications, and fossil fuel exploration industries have increasingly demanded more inexpensive materials with better and/or more customizable material properties. These material properties may include, for example, strength, weight, elasticity, directional strength, geometrical capabilities, or other engineering design capabilities. Composite materials, such as fibers, have proven to be especially useful to manufacturers with material property requirements similar to those outlined above.

Several techniques, such as pultrusion, spray lay-up, vacuum bagging, resin transfer molding, and automated tape placement, for example, have been used to manufacture components using composite materials. However, these and other known techniques may be limited in their range of applicability because of limitations in at least one material property capability. For example, spray lay-up provides for speedy manufacture at a reasonable price, but may only be capable of incorporating short fibers into a manufactured component, which may limit design control over many mechanical material properties. Similarly, pultrusion manufacture is economical and may provide good control over material properties of a manufactured component, yet it is often limited by the component geometries that may be produced. These and other drawbacks exist.

SUMMARY OF THE INVENTION

Various aspects of the invention address these and other drawbacks of known techniques. One aspect of the invention relates to an apparatus and method for producing components using composite materials inexpensively, for producing a variety of component geometries, for providing control over the material properties of a manufactured component, and for fabricating void-free component geometries. The apparatus and method may further enable a highly automated fiber lay-up fabrication process that may enable continuous (or substantially continuous) control over various aspects of the fabrication process. Aspects of the fabrication process under continuous (or substantially continuous) control may include fiber tension, fiber volume, fiber speed, fiber length, fiber position (or other position), matrix material volume, matrix material flow, matrix material pressure, or other aspects.

Some embodiments of the invention relate to an apparatus and method for performing highly automated, substantially continuous fiber lay-up. A fiber lay-up apparatus and method may include one or more fiber supplies from at least one fiber source, wherein a fiber may be fed under tension to provide a pre-stress to the fiber. The fiber lay-up apparatus may also include one or more splicing units that may splice together fibers from separate fiber supplies for various purposes.

One or more combination units may be provided for combining a fiber with a matrix material. The fiber lay-up apparatus may further include one or more regulating units. A regulating unit may regulate various aspects of a fiber combined with a matrix material. One or more cutting units may be provided for cutting fibers as the fibers are being layed-up. The fiber lay-up apparatus may also include one or more shaping units for shaping a fiber as the fiber leaves the fiber lay-up apparatus. In some embodiments, the fiber lay-up apparatus may further comprise a curing element. The curing element may cure or otherwise condition a fiber combined with a matrix material. One or more controls may be provided for controlling any or all of the units and/or elements of the fiber lay-up apparatus.

Fabrication of a component by the fiber lay-up apparatus may comprise multiple stages. Examples of stages may include, but are not limited to, an initial lay-up of a fiber, processing of a fiber subsequent to lay-up, or lay-up of a fiber based on a previous lay-up of another fiber. Other stages may be included. A shaped fiber that is output from one stage may be subjected to additional processing in subsequent stages to fabricate various types of components with various geometries and other characteristics.

In some embodiments, a fiber source may provide a feed of fiber. A fiber source may also include one or more fiber supplies. A fiber supply may comprise a fiber spool, a fiber creel, a vapor deposition chamber, or other type of fiber supply. According to one embodiment, a fiber may be fed under tension to provide a pre-stress to the fiber. The pre-stress may enhance one or more features of the fiber prior to being layed-up. As an example, the pre-stress may strengthen the fiber, or enhance another feature of the fiber.

According to some embodiments of the invention, a splicing unit may be employed to splice one fiber to another for various purposes. The splicing may include splicing two of the same types of fiber together (e.g., when a fiber supply is exhausted), or splicing two or more different types of fiber together. In some cases, it may be desirable to detect when a fiber supply is exhausted. This may enable the splicing unit to splice a trailing end of a fiber from an exhausted fiber supply to a leading end of a fiber from a new fiber supply. In both cases, this may enhance the ability to achieve a continuous (or substantially continuous) fiber feed.

A splicing unit may also splice at least one sensor into a fiber being fed from a fiber source. The sensor may be used, for example, to provide information about the fiber either before, during, or after the fiber is layed-up. Other advantages of the splicing unit disclosed herein will be apparent to those skilled in the art through use of the invention.

In some embodiments of the invention, a combination unit may combine a fiber with one or more matrix materials. Combining the fiber with one or more matrix materials may provide several advantages and greater flexibility. Among other things, combination of matrix material with a fiber may enable the fiber to be used in fabricating a three dimensional component.

According to various embodiments, a fiber and matrix material may be combined under pressure. The various aspects of the pressure may be controlled to provide different pressures such as, for example, a pulsed pressure, a differential pressure, or other pressure. Different pressures may provide several advantages such as, for example, reducing friction, providing a motive force to move the fiber through the combination unit, enhancing control over combination, providing the fiber with a common orientation, and/or providing other advantages. One or more combination units may be located at various points in the process to enable the combination function to be performed at desired locations.

According to an embodiment of the invention, a combination unit may combine a fiber and a matrix material under tension to pre-stress the fiber. The combination unit may include one or more non-contact seals. Various functions may be performed by the non-contact seal, such as providing a non-contact motive force to the fiber, combining the fiber and a matrix material under pressure, or other function. The non-contact seal may provide a non-contact motive force to the fiber via a pressurized fluid. The pressurized fluid may be pulsed and/or may be a matrix material for combination with the fiber.

A combination unit may further comprise a combination chamber. The combination chamber may be used for, among other purposes, combining one or more matrix materials to enable the fiber and matrix material to be combined under pressure. The combination chamber may further provide a non-contact motive force to the fiber. The combination chamber may include one or more sub-chambers for combining the fiber with the matrix. The sub-chambers may supply the matrix material at a differential and/or pulsed pressure to enhance a non-contact motive force provided to the fiber. The combination unit may further provide for changing the matrix material being used to impregnate a fiber without delaying the lay-up process.

According to some embodiments, a regulating unit may be used to regulate a fiber and/or matrix material that are output from the fiber lay-up apparatus. The regulating unit may be actively or passively actuated such that various aspects of the combined fiber and matrix material may be regulated such as, for instance, fiber volume, matrix material volume, or fiber to matrix material ratio. Other aspects may also be regulated. The regulating unit may further enable a supplemental matrix material to be combined with the fiber.

In some embodiments of the invention, a cutting unit for cutting a fiber may be used to create fibers of desired lengths. Cutting a fiber may create a trailing edge of a layed-up fiber from a leading edge of a fiber separated from the layed-up fiber. The cutting unit may shield the leading edge from any subsequent processing that the trailing edge may receive, such as shaping, curing (or otherwise conditioning), placing, or other processing.

According to some embodiments of the invention, a fiber shaping unit may include one or more shaping members that may be actively or passively actuated so as to provide enhanced control over the shape and placement of a fiber as the fiber leaves the fiber lay-up apparatus. The fiber lay-up apparatus may be usable with a plurality of interchangeable shaping members that may provide a variety of shaping and/or positioning functionalities such as smoothing, wiping, pressing, flattening, or sensing. Other shaping and/or positioning functionalities may be provided or realized. This may permit a particular shaping member or set of shaping members to be chosen for a specific fiber lay-up task based on the particular functionalities that the particular shaping member or set of shaping members provide.

In some embodiments of the invention, a curing element may be used for curing or otherwise conditioning a matrix material that has been combined with a fiber. The curing element may include an ultra-violet light source, a radio frequency source, a heat source, a heat sink, a chemical catalyst source, an electrical source, or other curing element. The curing element may harden the fiber and matrix material, or condition the fiber and matrix material in another manner.

According to one embodiment of the invention, a curing element may be located at a shaping unit. Further, the curing element and the shaping unit may be composed and configured such that a fiber may be cured and shaped simultaneously. For instance, the shaping unit may include a shaping member enabling the curing element to have access to the fiber as the shaping member is shaping the fiber. For example, the curing element may include an ultra-violet light source, and the shaping member may be transparent to light; or the curing element may be a heat source, and the shaping member may be conductive to heat. Other configurations may be used.

In some embodiments of the invention, the fiber lay-up apparatus may include a housing. The housing may be positionable based on a computerized script, via manual controls, via manipulation by hand, or controlled by an alternative method. The housing may comprise various units and/or elements of the fiber lay-up apparatus such as a fiber source, a splicing unit, a combination unit, a regulating unit, a cutting unit, a shaping unit, a curing element, or other unit or element.

The fiber lay-up apparatus may further include a position determining system capable of determining the position of the housing, or some other unit or element of the fiber lay-up apparatus, with some degree of precision. The position determining system may utilize a position determining technology such as Global Positioning System (GPS) technology, local laser triangulation technology, or other position determining technology. The position determining unit may enable the fiber lay-up apparatus to determine the position of any or all of the various parts of the apparatus during fabrication of a component.

According to some embodiments, the fiber lay-up apparatus may pre-stress fibers prior to lay-up to enhance desired characteristics of the fibers. For example, the fibers may be pre-stressed by using a predetermined amount of tension or other techniques at one or more points in the process. The tension of the fibers may be monitored by one or more tension units. The tension units may include tension sensors that may measure the tension of the fibers. The tension unit may further include one or more tension servo controllers to provide a control signal to control the tension units so that the fibers may be kept at a desired tension.

Movement of the fibers through the fiber lay-up apparatus may be provided via one or more types of motive force. For example, fiber feed mechanisms such as rollers, a belt drive, or other fiber feed mechanisms, may be used to provide a contact motive force to the fibers. Alternatively, the fiber feed mechanism may provide a non-contact type of motive force to feed the fibers. The non-contact motive force may be applied, for example, by using a pressure (e.g., a differential pressure, a pulsed pressure, a liquid pressure, a gaseous pressure, etc.), or other non-contact motive force method. The non-contact motive force may provide the fibers with a common orientation, and may enable the fibers to be fed and/or tensioned without experiencing friction, which may enable the fibers to maintain the common orientation without fraying, or causing other undesired effects associated with contact type motive force.

According to an embodiment of the invention, the fiber lay-up apparatus may include one or more sensors distributed to monitor various aspects of the apparatus and method throughout the lay-up process. Information from the sensors may be transmitted to one or more control units. A control unit may use information from the sensors to control various elements of the apparatus and method during fabrication. This may provide enhanced accuracy, precision, and other benefits. The sensors may be used to monitor such aspects as fiber speed, fiber length, fiber volume, fiber tension, fiber placement, matrix material pressure, matrix material flow, matrix material volume, fiber to matrix material ratio, pressure, position, and other aspects.

The sensors (or other aspects of the apparatus) may further provide providing quality control information about every fiber involved in a fiber lay-up application. According to another aspect of the invention, the apparatus enables an automated design interface. According to this aspect of the invention, based on a desired design for a component to be fabricated, the automated design interface may determine fabrication process parameters necessary to produce the component and control the apparatus accordingly. For example, the fabrication process parameters may include one or more of the type of fiber, fiber orientation, matrix material, placement, or other parameters. The desired design may include one or more of a desired geometry, component characteristics, quality, or other engineering goals.

A component fabricated by the apparatus may be an intermediate component, a final component, or some other component. While a final component may be fabricated ready for use, an intermediate component fabricated by the fiber lay-up apparatus may be subjected to further processing and/or fabrication before becoming a final component. Further processing and/or fabrication may include subsequent fabrication and/or processing performed by the fiber lay-up apparatus, an identical or similar fiber lay-up apparatus, a material removal apparatus such as a lathe, a mill, or other material removal apparatus, or another fabrication and/or processing apparatus.

In some embodiments of the invention, the fiber lay-up apparatus may be used to manufacture components that include an enhanced feature such as, for example, a high strength to weight ratio, a high directional strength, a higher directional strength in a first direction and a lower directional strength in a second direction, a desired coefficient of thermal expansion, or other feature. Some components manufactured by the fiber lay-up apparatus may include a compression spar, a webbing, a tendon, a fabric matrix, a tube, a rod, or virtually any other component.

In some embodiments of the invention, the fiber lay-up apparatus may be used to manufacture components of a particular system, such as a truss system, or other system. The truss system, for instance, may provide a low weight, high strength truss system for use in a shelter, a gantry crane, a bridge, or in any other structure that includes a truss system. The truss system may further provide a high strength by resolving all external forces internally, thereby including no external nodes.

In some embodiments, the truss system may include one or more compression spars that may be pre-stressed to provide increased strength. The one or more compression spars may be separated by a compression web, and a pre-stressing force may be applied to the one or more compression spars by a sleeve. The truss system may further include a tendon that, when tensioned, may provide the pre-stressing force that may be applied to the one or more compression spars via the sleeve. The truss system may be constructed such that the one or more compression spars and the tendon come together at each end, thereby providing no external nodes and permitting all external forces on the truss system to be resolved internally. The sleeve may be reinforced with at least one reinforcement band that may run tangential (or substantially tangential) to the tendon.

In some embodiments of the invention, the tendon may be tensioned and/or held in tension by a tensioning system. The tensioning system may comprise a hydraulic system, a winch system, a pulley system, another system, or a combination of systems. The tensioning system may provide a tensioning force on the tendon which may then provide the pre-stressing force that may be applied to the one or more compression spars. The tensioning system may be further activated to provide the tensioning force via a tensioning force control, or via another activation method. The tensioning system may further comprise a tensioning force meter that may display a tensioning force being applied by the tensioning system. This may enable the truss system in general, and the tensioning system in particular, to be monitored.

According to an embodiment of the invention, a truss system may be monitored by a truss monitoring system. The truss monitoring system may include at least one sensor that provides information about the structural integrity of the truss system. The sensor may be located at, or embedded in, one or more components of the truss system. The information acquired by the sensor may be transmitted by an information-carrying fiber located at, or embedded in, the one or more components, and may comprise an optical fiber or other type of information-carrying fiber. The information acquired by the sensor may be transmitted to a computer that may include software capable of receiving and displaying the information so as to convey the structural integrity of the truss system to a user.

According to one embodiment of the invention, the truss system as disclosed herein may be used as a component of a shelter system. The shelter system may comprise a plurality of truss systems for supporting a covering system. The covering system may include a plurality of covering layers with a separation between each for providing insulation. The separation between the covering layers may, in one embodiment, be provided by a network of separation strips. The separation strips may comprise inflatable strips, strips of foam, or any other type of separation strip.

According to one embodiment, some or all of the separation strips may comprise a heating element, which may be utilized to increase snow melt and run-off for shelter systems in colder climates. In some embodiments of the invention, the covering system may include covering panels that may be held in place by the plurality of truss systems by a track system such as a keder track system, or other track system.

In some embodiments of the invention, the shelter system may include an opening system for opening an end of the shelter system. The opening may provide access to the interior of the shelter system. The opening system may comprise an opening actuation system for opening the end of the shelter system by retracting or releasing an opening line. The opening actuation system may, in various implementations, comprise a winch system, a pulley system, or other system.

In some embodiments of the invention, the shelter system may be disassembled and/or broken down for transporting the shelter system to a new location. The shelter system may be associated with a volume to which the disassembled shelter system may be reduced for transport or storage. This volume may be referred to as, for instance, a cargo footprint. The cargo footprint of the shelter system may be minimized because, in certain embodiments, the one or more compression spars may comprise the only rigid components of the shelter system. The cargo footprint of the shelter system may be further minimized by reducing the one or more compression spars to a set of connecting compression spar sections that may fit together at section connections. The section connections may comprise a slotted male/female connection, a screw-in connection, or other connection.

These and other objects, features, and advantages of the invention will be apparent through the detailed description of the preferred embodiments and the drawings attached hereto. It is also to be understood that both the foregoing general description and the following detailed description are exemplary and not restrictive of the scope of the invention.

BRIEF DESCRIPTION OF THE DRAWINGS

FIG. 5 illustrates an exemplary embodiment of a regulating unit, cutting unit, a shaping unit, and a curing element.

FIG. 25 illustrates various views of a covering for a shelter system, according to an embodiment of the invention.

DETAILED DESCRIPTION OF THE INVENTION

Figure 1:
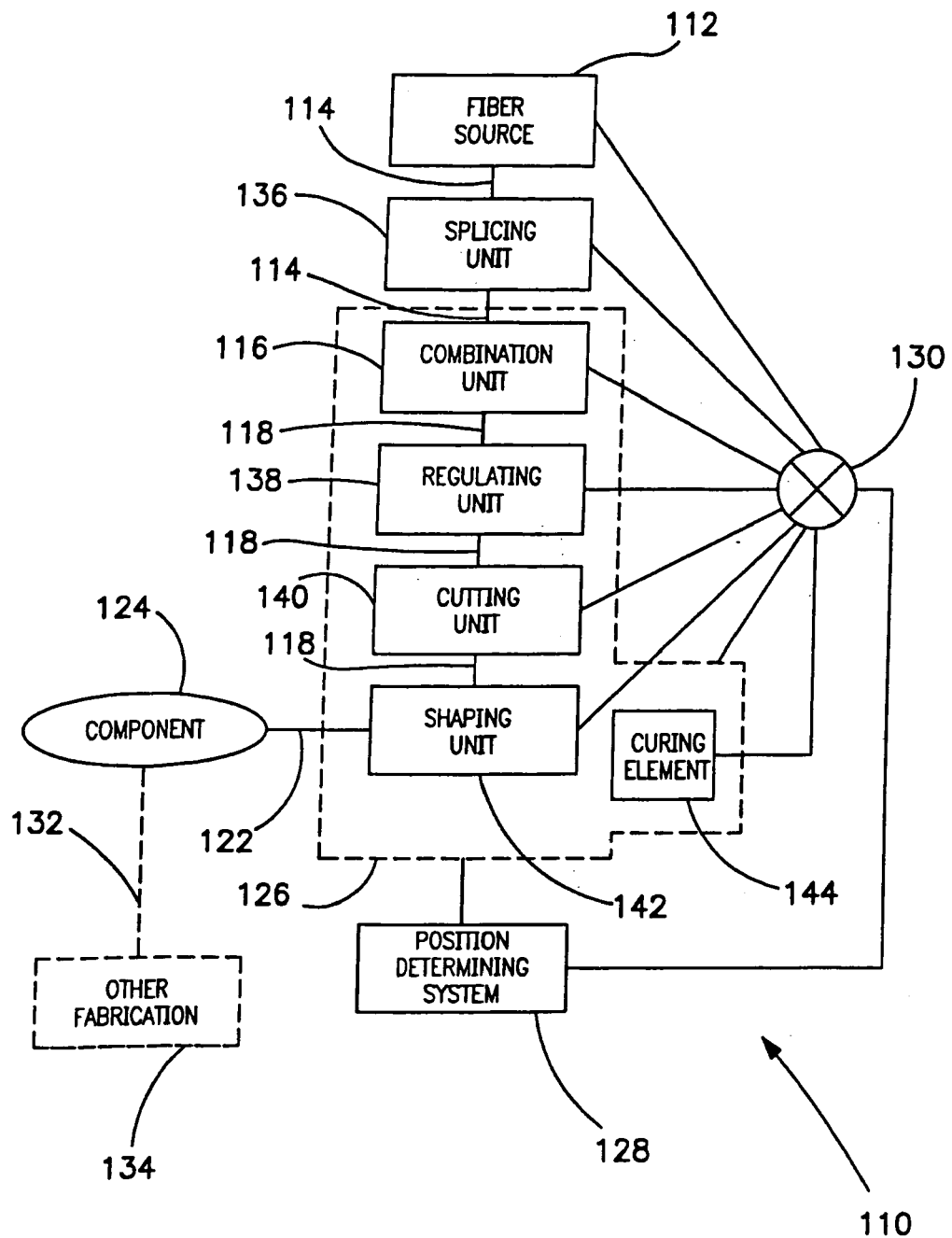
FIG. 1 illustrates an exemplary embodiment of a fiber lay-up apparatus.

Various aspects of the invention relate to an apparatus and method for performing automated fiber lay-up. FIG. 1 illustrates an embodiment of a fiber lay-up apparatus 110. Fiber lay-up apparatus 110 may comprise a fiber source 112 that may release or feed one or more dry fibers 114 under tension. Fiber 114 may be released under tension to provide a pre-stress to the fiber 114. Fiber 114 may further be fed through a splicing unit 136 that may be employed to splice one fiber to another for various purposes.

A combination unit 116 may be provided to combine fiber 114 with one or more matrices to create a fiber 118 combined with the matrix. The matrix material may enable the one-dimensional fiber 118 to be used in three-dimensional fabrication. The fiber 118 and matrix material may be combined under pressure, which may be pulsed, for example, to reduce friction, provide a motive force to fiber 118, enhance control over combination, or provide other benefits.

A regulating unit 138 may be provided for imparting a desired cross-sectional shape to fiber 118, and may further regulate the volume of fiber 118 and/or matrix material that are output from fiber lay-up apparatus 110. A cutting unit 140 may be used to cut fiber 118 to a desired length, or may provide alternative functionality. A shaping unit 142 for shaping fiber 118 into output fiber 122 may further place fiber 122 on a component 124 as a stage in the fabrication of component 124. A curing element 144 may cure or otherwise condition fiber 122. The fabrication of component 124 may further include one or more other stages 132 that may be provided by one or more elements of fiber lay-up apparatus 110, or by another fabrication apparatus 134.

Fiber lay-up apparatus 110 may include a housing 126. Housing 126 may include any or all of the various elements and/or units of fiber-layup apparatus 110. Housing 126 may enable the various elements and/or units of fiber lay-up apparatus 110 included in housing 126 to be collectively actuatable, which may enable the various elements and/or units to be simultaneously and actively positioned about component 124 during the fabrication of component 124.

A position determining system 128 may be provided for determining the position of one or more of the various elements and/or units of fiber lay-up apparatus 110 during fabrication of component 124. Position determining system 128 may utilize or incorporate known position determining technology such as, for example, GPS, local laser triangulation, sonar triangulation, or other technology. Position determining system 128 may be operatively linked to a control 130 that may use information received from position determining unit 128 to control the position of housing 126 and/or other elements and/or units of fiber lay-up apparatus 110.

Figure 2:
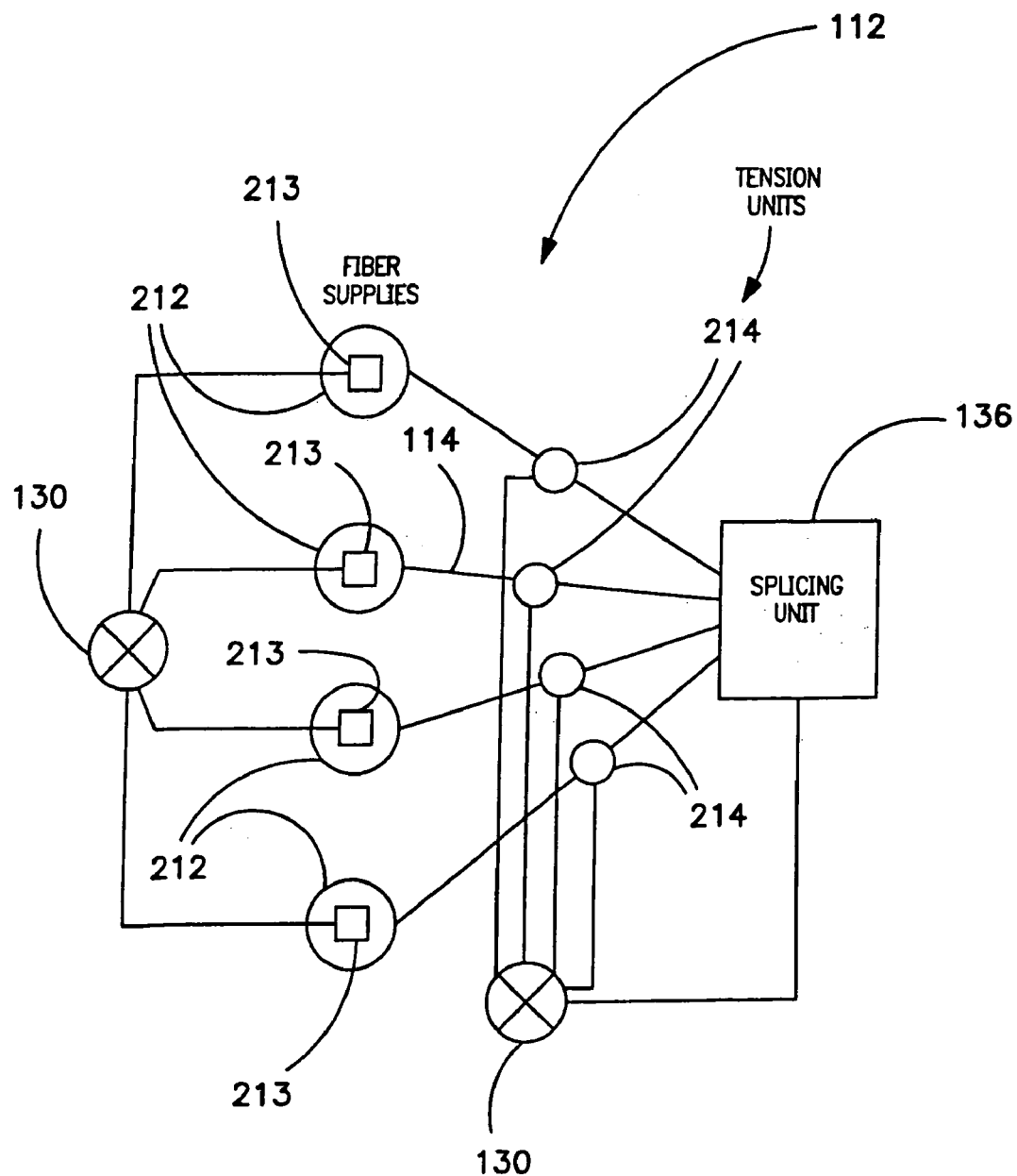
FIG. 2 illustrates an exemplary embodiment of a fiber source.

FIG. 2 illustrates an exemplary embodiment of fiber source 112. Fiber source 112 may provide one or more fibers 114 from one or more fiber supplies 212. A fiber supply may comprise a fiber spool, a fiber creel, a vapor deposition chamber, or other type of fiber supply. Fiber supply 212 may further comprise a fiber supply motor 213 for releasing a feed of fiber 114 from fiber supply 212. Fiber supply motor 213 may be operatively connected to control 130. Control 130 may control fiber supply motor 213 to release a specified amount of fiber or to release fiber from fiber supply 212 at a specified rate. Fiber supply 212 may release fiber 114 under tension to provide a pre-stress to fiber 114.

According to one embodiment, fiber source 112 may include one or more tension units 214, that may be operatively linked to control 130, for monitoring a tension of fiber 114 to insure that fiber supply 212 is releasing fiber 114 at a desired tension. Tension unit 214 may further comprise a tension servo to adjust the tension of the feed of fiber 114.

Figure 3:
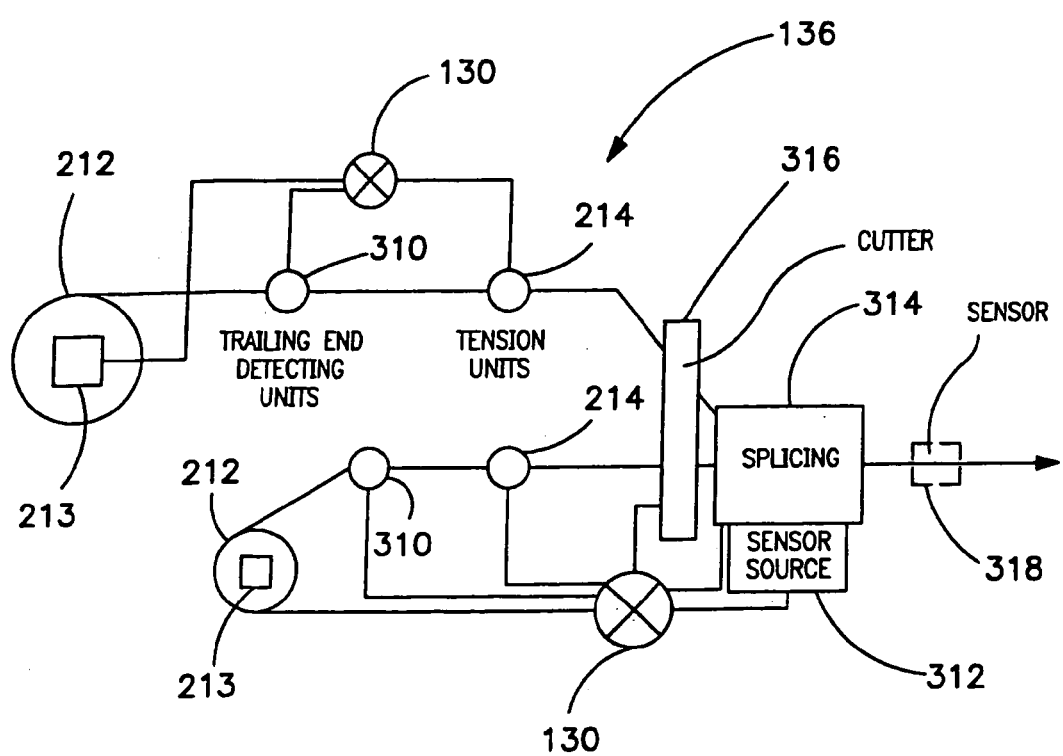
FIG. 3 illustrates an exemplary embodiment of a splicing unit.

FIG. 3 illustrates an exemplary embodiment of splicing unit 136 including a splicer 314 that may be used to make the feed of fiber 114 continuous (or substantially continuous). Splicing unit 136 may rely on at least one trailing end detecting unit 310 associated with fiber supply 212, and may be employed to detect when the fiber from fiber supply 212 has been exhausted. Trailing end detecting unit 310 may be operatively connected to a control 130. Upon detection of a trailing end signifying the exhaustion of exhausted fiber supply 212, trailing end detecting unit 310 may send a signal to control 130. Control 130 may then enable splicer 314 to splice a trailing end of exhausted fiber supply 212 to a leading end of new fiber supply 212, which may be held at splicer 314, thereby incorporating new fiber supply 212 into fiber source 112. Splicer 314 may splice the trailing end to the leading end by a splicing method including, but not limited to, adhesion or air turbulation. Thus, fiber source 112 may provide a continuous (or substantially continuous) feed of fiber 114.

According to one embodiment, splicing unit 136 may also be used to splice at least one sensor 318 sensor source 312 into the feed of fiber 114 being fed from fiber supply 212 by splicer 314. Sensor 318 may comprise a strain sensor, a saturation sensor, an optical sensor, a combination thereof, or other type of sensor. Sensor 318 may then be used to provide information about fiber 114 either before, during, or after fiber 114 is layed-up.

Splicing unit 134 may include a cutting unit 316 to cut the feed from fiber supply 212 before fiber supply 212 has been exhausted. This may enable the splicing unit 136 to change fiber supplies 212. Fiber supplies may be changed, for example, when a change in the type of fiber used in the feed of fiber 114 is desired, or to embed sensor 318 in the feed of fiber 114 at a desired location.

It should be recognized that the recitation of a single splicing unit (splicing unit 136) is exemplary only, and that fiber lay-up apparatus 110 may comprise a plurality of splicing units. The plurality of splicing units may enable fiber source 112 to provide a continuous (or substantially continuous) feed of fiber 114, to splice the at least one sensor 318 into fiber 114, or to provide other functionality.

Figure 4A:
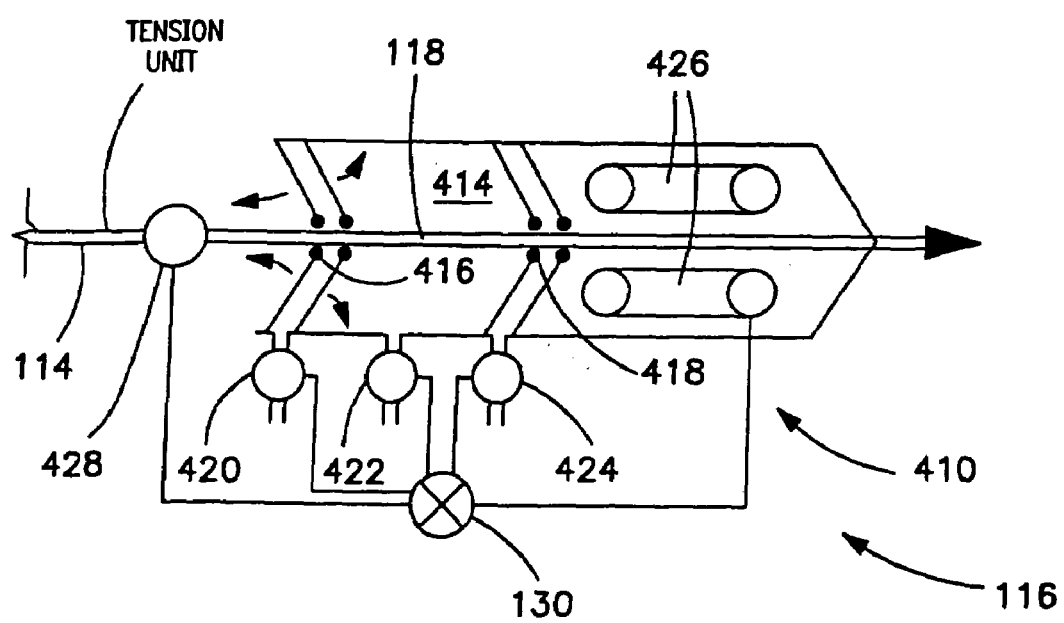
FIGS. 4A–4B illustrate exemplary embodiments of a combination unit, including a combination chamber.

FIG. 4A illustrates an exemplary embodiment of a combination unit 116. Combination unit 116 may be utilized to combine a feed fiber 114 with a matrix material, and may include at least one combination chamber 414. Combination chamber 414 may include one or more fiber inlet seals 416, and/or one or more fiber outlet seals 418. Fiber inlet seal 416 may be actuatable to open for the feed of fiber 114, or to close on the feed of fiber 114. For example, fiber inlet seal 416 may comprise a material of a thickness and composition such that fiber inlet seal 416 may open for the feed of fiber 114 when a matrix material provided in fiber inlet seal 416 reaches a desired pressure.

According to an embodiment of the invention, the matrix material may be introduced into fiber inlet seal by a matrix material pump 420, operatively connected to control 130. Pressure within combination chamber 414 may be controlled, for example, by a metered inlet 422, operatively linked with control 130. An impregnated fiber 114 may pass out of combination chamber 414 by way of a fiber outlet seal 418. Fiber outlet seal 418 may be composed partially or completely of an abrasion preventive material to decrease an amount of friction experienced by the feed of fiber 114.

As an example, fiber outlet seal 418 may include a lubrication pump 424, operatively connected to control 130, that may inject a lubricant into fiber outlet valve 418 to lubricate fiber outlet valve 418. The lubricant provided to fiber outlet valve 418 by lubrication pump 424 may also coat fiber 118 to reduce friction. The pressures in fiber inlet seal 416, combination chamber 414, and/or fiber outlet seal 418 may be controlled via control 130 such that the pressures may: hold fiber inlet seal 416 and fiber outlet seal 418 open; provide a motive force creating a non-contact feed; provide the fibers 118 with a common orientation; and/or provide other benefits. For example, the pressure may be differential and/or pulsed to provide a greater motive force to fiber 118 through combination chamber 414, and/or may insure that fiber 118 may pass through combination chamber 414 without contact, which may increase uniformity of fiber orientation and reduce fiber fraying due to friction. Controlling the pressures in fiber inlet seal 416, combination chamber 414, and/or fiber outlet seal 418 may enable fiber 118 to be saturated more completely, may reduce friction, or provide other benefits.

According to one implementation, subsequent to exiting combination chamber 414, fiber 118 may be engaged by a feeding mechanism 426. Feeding mechanism 426 may comprise one or more rollers, a belt drive, or other feeding mechanism. Feeding mechanism 426 may feed fiber 118 through and out of combination unit 116, and may keep the feed of fiber 114 under a desired tension. In alternative embodiments, one or more feeding mechanism 426 may be provided in an upstream position from combination chamber 414, or even positioned inside combination chamber 414, rather than in a downstream position as illustrated in FIG. 4A. Multiple feed mechanisms may also be used. Other configurations may be utilized.

According to an embodiment of the invention, combination unit 116 may include a tension unit 428 operatively linked to control 130, that may detect a tension in the feed of fiber 114 as the feed of fiber 114 enters combination unit 116. Information relating to this tension may be transmitted to control 130, which may adjust feeding mechanism 426, or adjust the pressure in fiber inlet seal 416, combination chamber 414, and/or outlet seal 418 accordingly. Tension unit 428 may further include one or more tension servos that may be controlled by control 130 to provide the feed of fiber 114 with a desired tension.

Figure 4B:
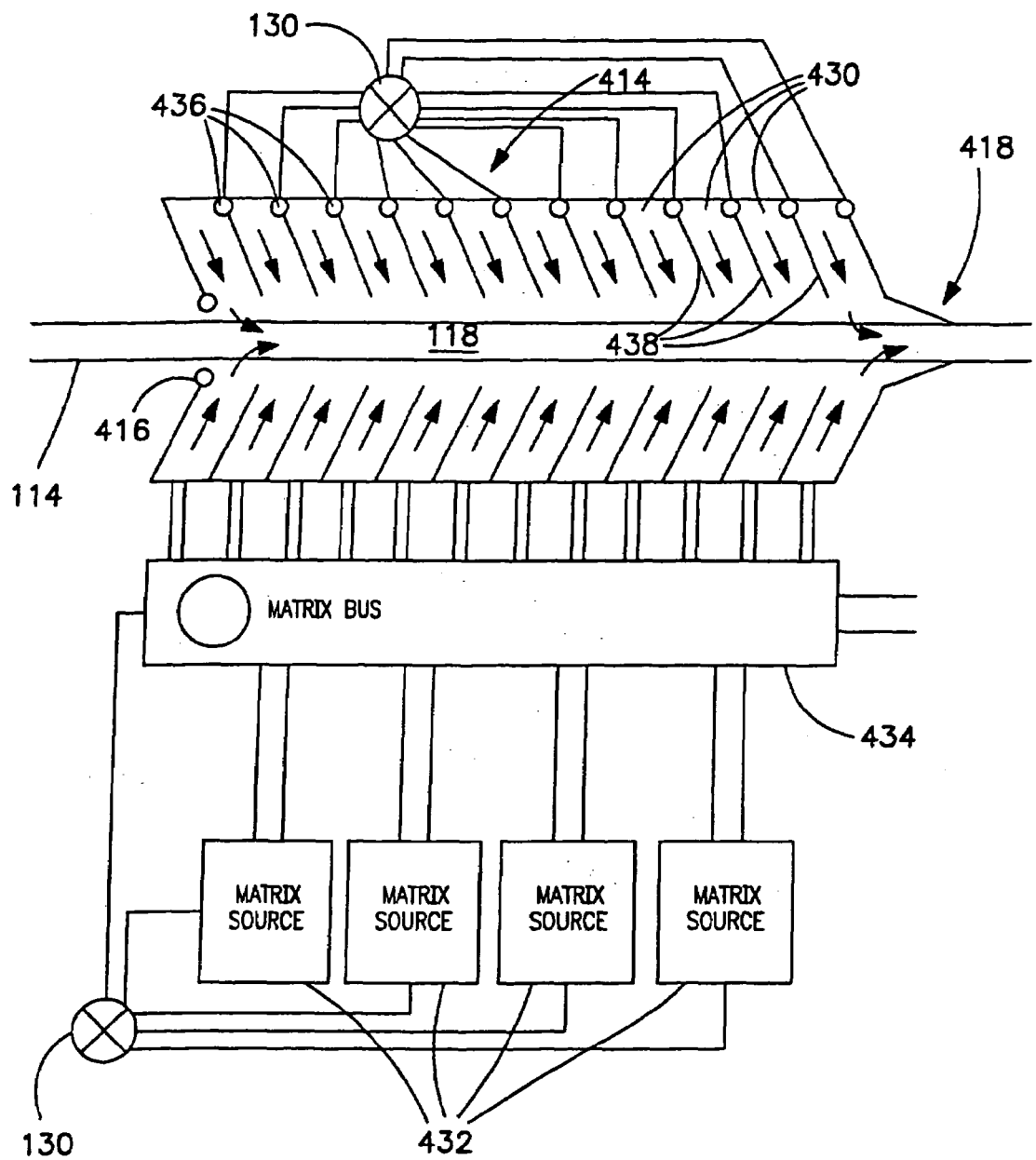

FIG. 4B illustrates an exemplary embodiment of combination chamber 414 of combination unit 116. Combination chamber 414 may include a plurality of sub-chambers 430 that may be separated by one or more sub-chamber membranes 438. Sub-chambers 430 may be provided with matrixes from one or more matrix material sources 432 via a matrix material bus 434, operatively connected to control 130. Combination unit 414 may include one or more sub-chamber sensors 436, operatively linked with control 130, for monitoring one or more sub-chambers 430, and may transmit information related to one or more aspects of the fiber and matrix material combination to control 130. Information transmitted from sub-chamber sensors 436 may include pressure, fiber speed, matrix material composition, or other information.

Matrixes may arrive from matrix material source 432 at matrix material bus 434 under a desired pressure. The pressure may be provided by any number of pressurization methods including, for example, pumping, or storage under a fixed pressure. The pressure, composition, and/or volume of matrix material supplied to matrix material bus 434 by matrix material source 432 may be controlled via the operative connection between matrix material source 432 and control 130.

According to an embodiment of the invention, matrix material bus 434 may transmit and/or receive information about matrix material arriving from matrix material source 432 to and/or from control 130. Matrix material bus 434 may also be controllable via control 130 to provide matrix material of a desired composition to a specific sub-chamber 430 at a desired pressure.

The matrix material composition and/or pressure of the matrix material supplied to sub-chamber 430 may be configured based on a feature of sub-chamber 430, fiber 118, and/or the particular lay-up process, such as, for example, the location of sub-chamber 430 with respect to fiber inlet seal 416 and/or fiber outlet seal, the speed of fiber 118, the desired speed of fiber 118, the composition of fiber 118, the composition of the matrix, the tension of the fiber 118, the desired tension of the fiber 118, or other parameters. Matrix material bus 434 may further enable the matrix material to be delivered to sub-chamber 430 in a pulsed manner to provide an enhanced fiber and matrix material combination feature such as, for instance, configurable tension and/or speed of fiber 118, timelier saturation of fiber 118, reduction of fraying due to friction experienced by fiber 118, increased uniformity of fiber orientation, or other features.

FIG. 5 illustrates an exemplary embodiment of fiber lay-up apparatus 110 including regulating unit 138, and may output output fiber 122 to component 124 via a curing zone 516. Regulating unit 138 may be configured so as to regulate the volume of fiber 118 and matrix material that pass into curing zone 516. Regulating unit 138 may regulate various aspects of the volume of combined fiber and matrix such as, for example, overall fiber and matrix material volume, overall fiber and matrix material shape, and matrix material volume. Regulating unit 138 may be actively or passively configured, and may include one or more matrix material inputs 520 for supplying additional matrix material to fiber 118.

In some embodiments, fiber lay-up apparatus 110 may include a cutting unit 140 that may be controllable by control 130 to cut fiber 118 to end lay-up of fiber 118. Cutting unit 140 may include a cutting member actuator 528 that may actuate an active cutting member 524 in such a manner as to shear fiber 118 between active cutting member 524 and a passive cutting member 526. This may effectively sever fiber 118 from output fiber 122. Cutting unit 140 may further comprise a forwarding actuator 530 that may enable the active cutting member 524 to provide a motive force to output fiber 122 along curing zone 516. As an example, active cutting member 524 may be pivoted about forwarding actuator 530.

Curing, zone 516 may include a space between upper shaping member 510 and lower shaping member 512 that may be composed of a flexible material. Upper shaping member 510 and lower shaping member 512 may be actuated to proved a desired volume and/or shape to output fiber 122. Upper shaping member 510 may be actuated, for example, along the direction of arrow 532 by, for instance, one or more tendons 534 that may be manipulated by an upper shaping member actuator 536. Upper shaping member actuator 536 may be operatively controlled via control 130. Lower shaping member 512 may be actuated, for example, along the direction of arrow 538. Upper shaping member 510 and lower shaping member 512 may further include one or more output sensors 540 that may be operatively connected to control 130, and may transmit information to control 130 corresponding to at least one aspect of output fiber 122 lay-up. Examples of transmitted information may include the volume of output fiber 122, the speed of output fiber 122, the pressure experienced by upper shaping member 510 and/or lower shaping member 512, or other information.

In some embodiments of the invention, fiber layup apparatus 110 may further comprise a curing element 542 that may cure or otherwise condition matrix material associated with output fiber 122. Curing element 542 may be operatively connected to control 130, and may include a UV light source, an alternative light source, a heat source, a heat sink, a high frequency source, or other curing element. The composition of upper shaping member 510 and/or lower shaping member 512 may be such that upper shaping member and/or lower shaping member may provide improved access for curing element 542 to curing zone 516. For example, in an implementation wherein curing element 542 may be a UV light source, upper shaping member 510 may be transparent to UV light, and lower shaping member 512 may be reflective to UV light. Alternatively, where curing element 542 may be a heat source, upper shaping member 510 may conduct heat from curing element 542 to curing zone 516. Other configurations may be utilized.

According to one embodiment of the invention, upper shaping member 510 and a lower shaping member 512 may be actively actuated so as to provide enhanced control over the shape and/or placement of output fiber 122 as output fiber 122 leaves fiber lay-up apparatus 110. Shaping members (510, 512) may comprise a squeegee member, a nip roller member, or other shaping member, and may be actuated via a tendon, or by other methods. Upper shaping member 510 and/or lower shaping member 512 may be interchangeable with other shaping members (not shown) that may provide alternative shaping and positioning functionalities. Upper shaping member 510 and lower shaping member 512 may further perform a variety of shaping and placing operations such as, for example, flattening, smoothing, wiping, or sensing. Other operations may be performed.

Figure 6:
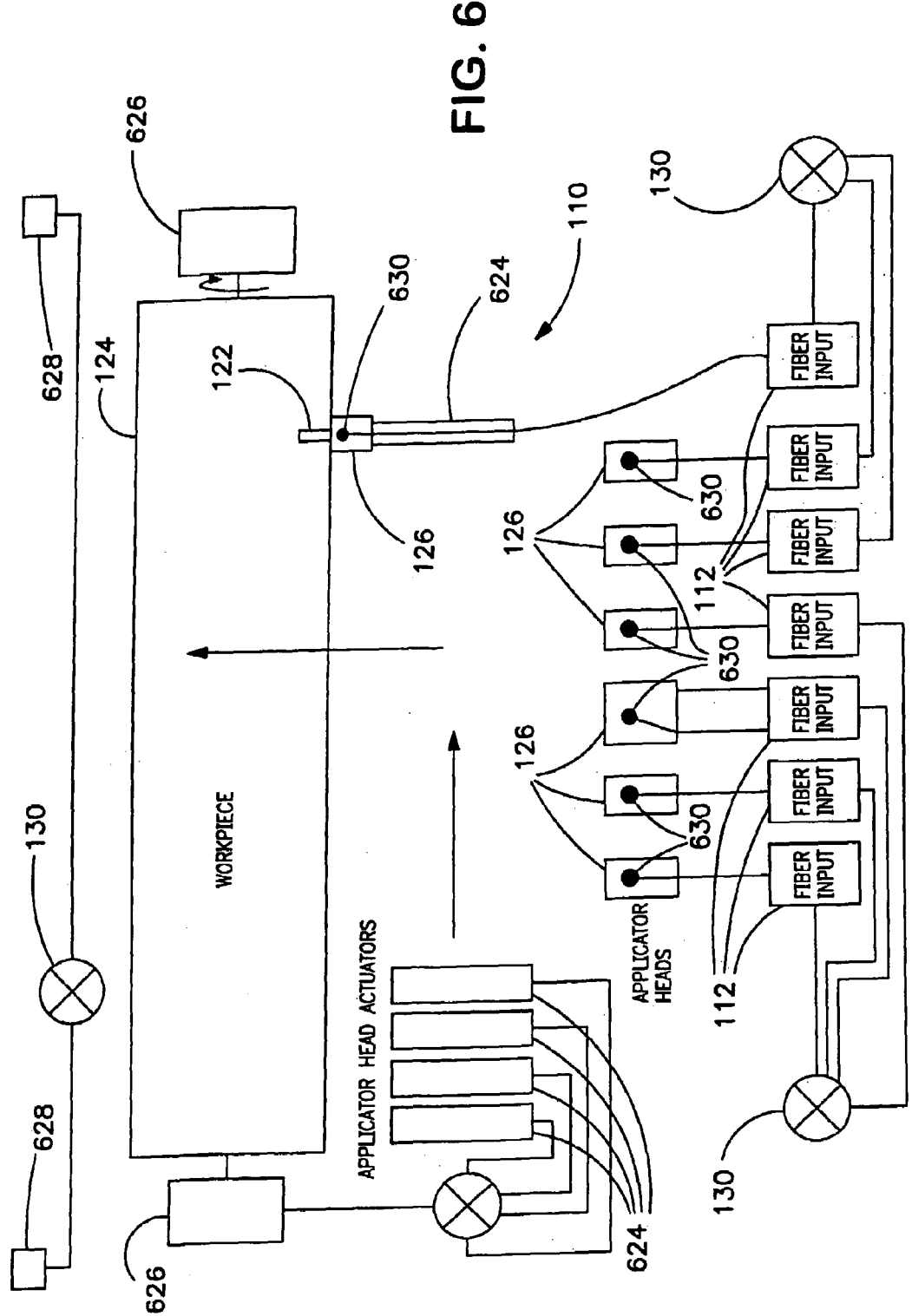
FIG. 6 illustrates an exemplary embodiment of a fiber lay-up apparatus.

FIG. 6 illustrates an exemplary embodiment of fiber lay-up apparatus 110 that may include one or more housings 126, and one or more fiber sources 112. Housing 126 may be controlled by controller 130, and may include a housing sensor 630 operatively linked to control 130. Housing sensor 630 may provide control 130 with information associated with housing 126 such as, for example, positioning information, velocity information, or other information. Fiber lay-up apparatus 110 may further include one or more housing actuators 624 that may be controllable via control 130 to selectively engage housing 126 such that housing 126 may be positioned by housing actuator 624 to lay-up output fiber 122 onto component 124. Housing actuator 624 may comprise a hydraulic arm, or other actuator. It will be appreciated that any number of housings 126 may be used simultaneously by housing actuators 624 to lay-up multiple output fibers, and that utilizing additional housings 126 and housing actuators 624 may increase the speed of fabrication of component 124.

In some embodiments of the invention, a component positioning device 626 may position component 124 in a fixed location, or may actively position component 124 in conjunction with housings 124 and housing actuators 624. The fiber lay-up apparatus 110 may further include position determining system 128. Position determining system 128 may include one or more system reference components 628 to provide a reference for position determining system 128. System reference component 628 may include a laser light source in a laser triangulation system, a satellite in a geo-synchronous orbit in a GPS system, or other reference component.

Figure 7:
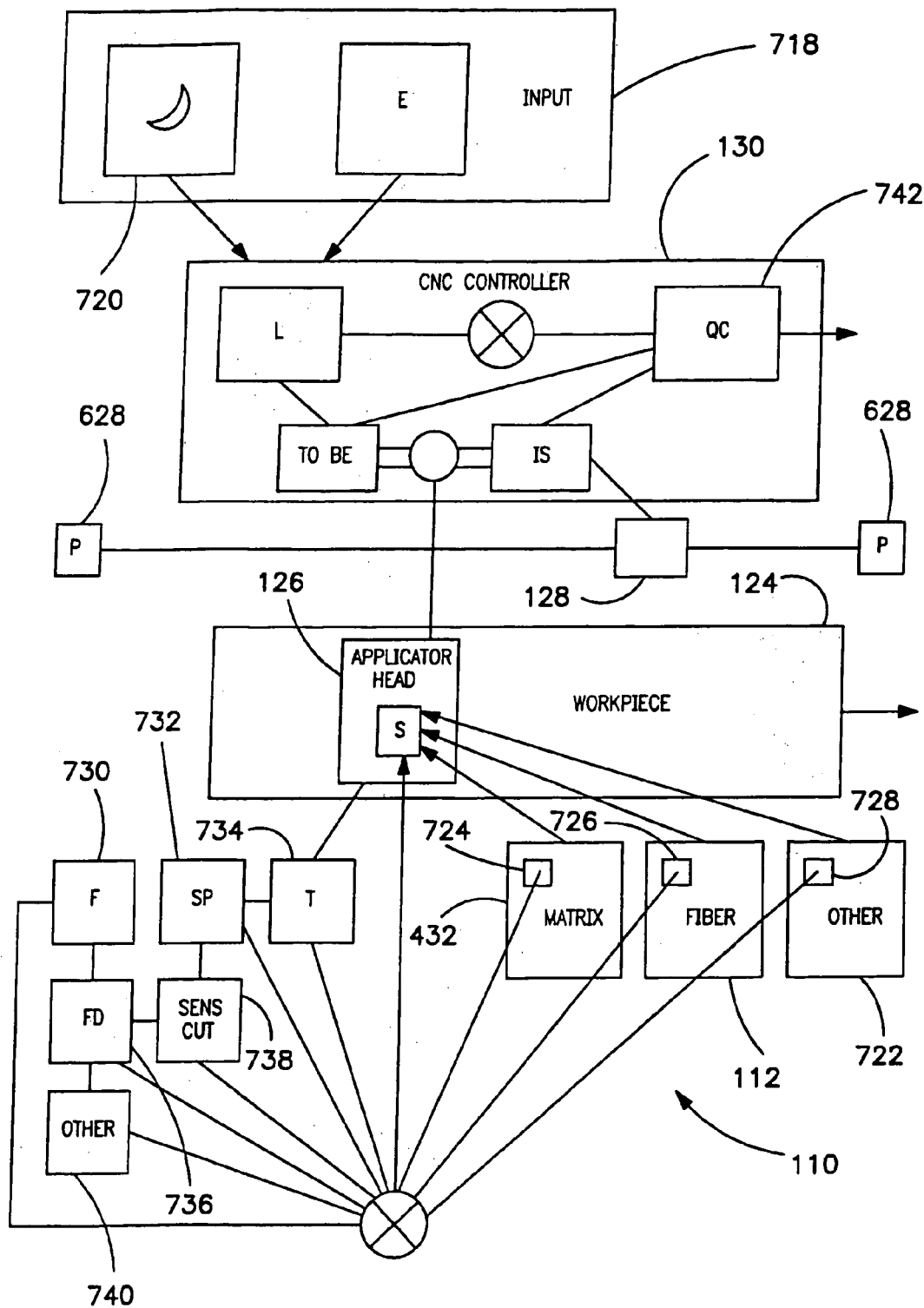
FIG. 7 illustrates an exemplary embodiment of a fiber lay-up apparatus including a control.

FIG. 7 illustrates an exemplary embodiment of fiber lay-up apparatus 110 including control 130. Fiber lay-up apparatus 110 may include an input module 718 that may include a component geometry interface 720. Component geometry interface 720 may enable a desired geometry of component 124 to be fabricated by fiber lay-up apparatus 110, and may comprise a computer aided drafting (CAD) input interface, or other interface. Input module 718 may include an engineering properties interface that may enable various engineering properties of component 124 to be specified. An engineering property may include, among other properties, rigidity, elasticity, weight, strength, or strength in a given direction.

According to an embodiment of the invention, information from input module 718 may be provided to control 130 for creating a fiber lay-up plan related to the fabrication of component 124. The fiber lay-up plan may include one or more fabrication commands designed to enable one or more of the various elements of fiber lay-up apparatus 110 to fabricate component 124.

According to one embodiment, fiber lay-up apparatus 110 may further include matrix material source 432, fiber source 112, and/or another source 722. Fiber lay-up apparatus 110 may also one or more sensor control units associated with various sources of fiber lay-up apparatus 110, such as matrix material sensor control unit 724, fiber source sensor control unit 726, and/or other source sensor control unit 728. Fiber lay-up apparatus 110 may further include housing 126 and one or more sensor control units associated with various aspects of the fabrication of component 124, such as a fiber sensor control unit 730, a speed sensor control unit 732, a tension sensor control unit 734, a feed sensor control unit 736, a splicer/cutter sensor control unit 738, and/or another sensor control unit 740. The various sensor control units may provide sensor information to control 130 and may further control housing 126, matrix material source 432, fiber source 112, and/or other source 722 based on control information provided by control 130.

According to some embodiments, fiber lay-up apparatus 110 may include position determining system 128 that may include system reference components 628 and housing sensor 630. Position determining system 128 may be operatively linked to control 130 and may provide control with actual positioning information associated with housing 126 such as, for example, coordinates relating to the position of housing 126, or other information. Control 130 may then compare the actual positioning information associated with housing 126 with desired positioning information of housing 126 and may generate a positioning command that may enable the actual positioning information to coincide with the desired positioning location. Once the actual positioning information coincides with the desired positioning information, a fabrication command associated with the desired positioning information may be executed by fiber lay-up apparatus 110.

It will be appreciated that the position determining system described above may provide enhanced positioning over known position determining systems such as those, for example, which utilize machine encoders. Enhanced positioning may include, among other benefits, enhanced accuracy, enhanced precision, and enhanced speed. It should further be recognized, however, that the foregoing recitation is not meant to limit the invention and, as such, fiber lay-up apparatus 110 may be used with any well-known position determining system.

In some embodiments of the invention, control 130 may include a quality control module 742. Quality control module 742 may enable quality control information gathered by the various sensor control units to be conveyed and/or analyzed during and/or after fabrication. Quality control module 752 may provide quality control information to be conveyed via a quality control interface that may be located locally at control 130, or remotely in an alternative configuration.

Figure 8:
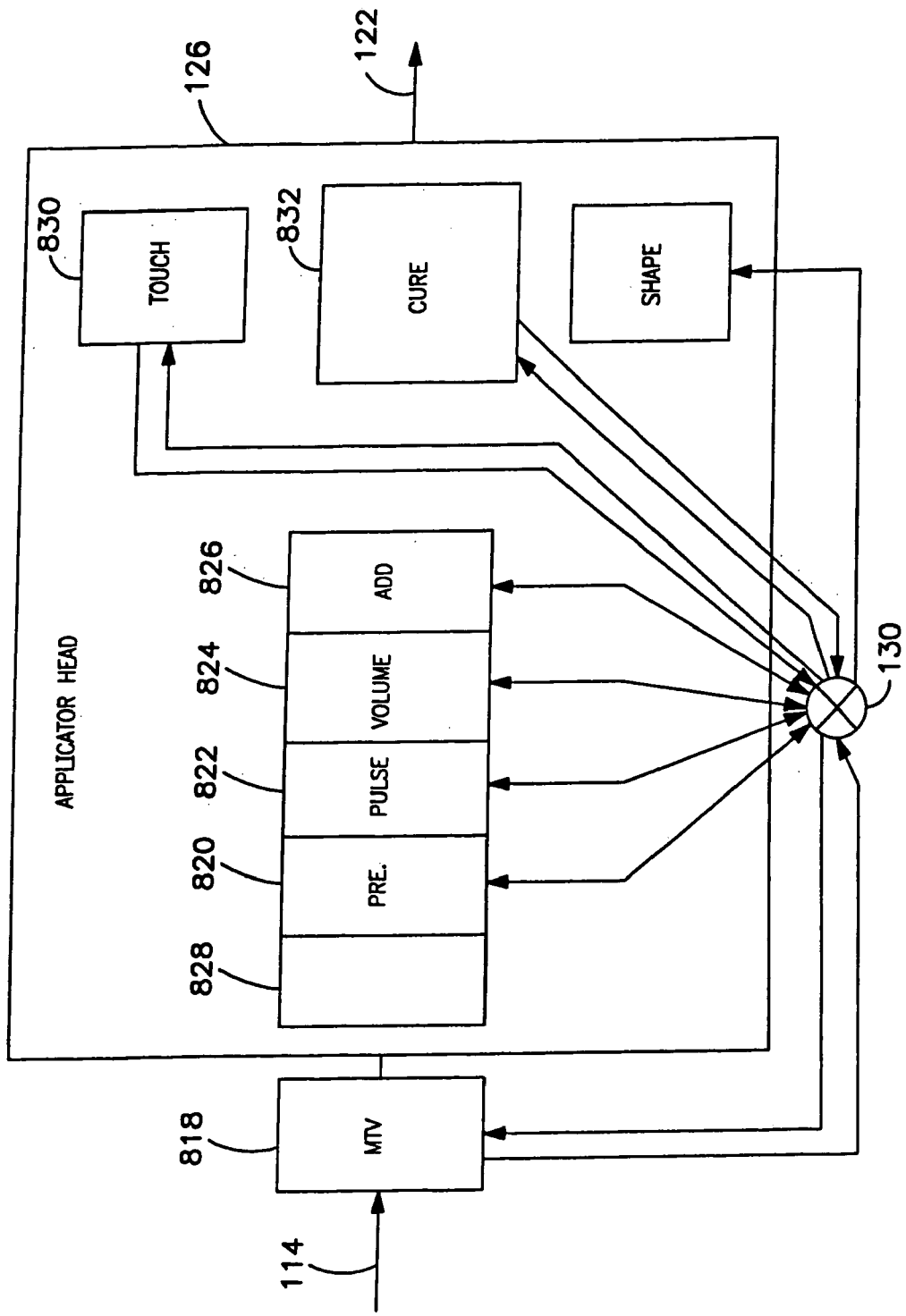
FIG. 8 illustrates an exemplary embodiment of a fiber lay-up apparatus including a control.

FIG. 8 illustrates an exemplary embodiment of fiber lay-up apparatus 110 featuring control 130. Housing 126 may receive the feed of fiber 114 via a fiber feed sensor control unit 818 that may determine a fiber volume, a fiber tension, and/or a fiber length, may be operatively connected to control 130, and may provide information associated with the feed of fiber 114 to control 130. Fiber feed sensor control unit 818 may further be capable of receiving one or more fabrication commands and may execute one or more fabrication commands. Housing 126 may also include a pre-combination matrix material sensor control unit 820 operatively linked to control 130 that may monitor and/or execute one or more pre-combination material fabrication commands, a matrix material pulse sensor control unit 822 operatively linked to control 130 that may monitor and/or execute one or more matrix material pulse fabrication commands, a matrix material volume sensor control unit 824 operatively linked to control 130 that may monitor and/or execute one or more matrix material volume fabrication commands, a post-combination matrix material sensor control unit 826 operatively linked to control 130 that may monitor and/or execute one or more post-combination matrix material fabrication commands, and/or another sensor control unit 828 operatively linked to control 130 that may monitor and/or execute one or more other fabrication commands.

According to an embodiment of the invention, housing 126 may include a pressure sensor control unit 830 that may be operatively connected to control 130. Pressure sensor control unit 830 may measure and/or control the pressure felt by a shaping member, such as upper shaping member 510, lower active output 512, or another active output. Housing 126 may also include a curing sensor control unit 832 that may be operatively linked to control 130 and may measure and/or control the output of a curing element associated with a fiber lay-up process, such as curing element 144. Housing 126 may further include a cross-section shape sensor control unit 834 that may be operatively connected to control 130. Cross-section shape sensor control unit 834 may measure and/or control a cross-section shape of output fiber 122, and may enable active shaping of an output fiber in regulating unit 138 and/or curing zone 516. It will be appreciated that the various sensor control units of the embodiment illustrated in FIG. 8 may be provided at housing 126 to enhance the control of control 130 over various steps of a fiber lay-up process. Further, the sensor control units recited are exemplary in nature and should not be viewed as limiting.

It should be recognized that component 124 (fabricated by the apparatus) may be an intermediate component, a final component, or some other component. While a final component may be fabricated as ready for use, an intermediate component fabricated by fiber lay-up apparatus 110 may be subjected to further processing and/or fabrication before becoming a final component. Further processing and/or fabrication may include subsequent fabrication and/or processing performed by fiber lay-up apparatus 110, an identical or similar fiber lay-up apparatus, a material removal apparatus, such as a lathe, a mill, or other material removal apparatus, or another fabrication and/or processing apparatus.

Figure 9:
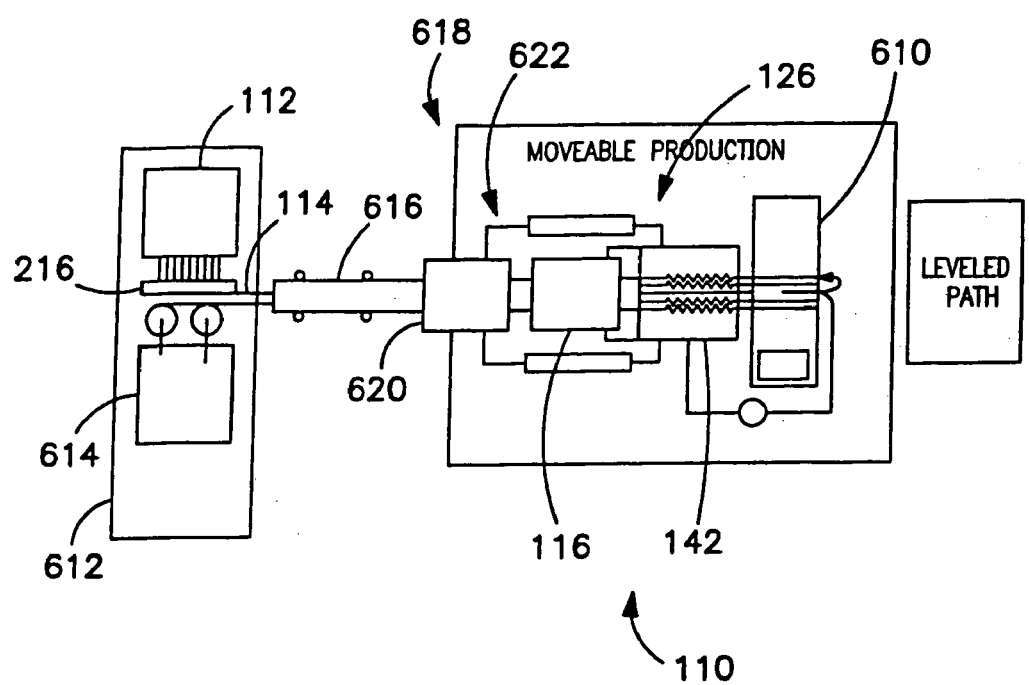
FIG. 9 illustrates an exemplary embodiment of a fiber lay-up apparatus.

FIG. 9 illustrates an exemplary embodiment of fiber lay-up apparatus 110 that may be configured to produce a pipe component 610. Fiber lay-up apparatus 110 may include a storage section 612 that may be stationary during the fiber lay-up process, and may further comprise a fiber source 112, a splicing unit 216, and a matrix material supply 614 that may supply matrix material to combination unit 116. A feed of fiber 114 and/or the matrix material may travel through a delivery pipe 616 to housing 126, which may include combination unit 116, and/or shaping unit 142. Housing 126 may be positionable by a moving unit 618 comprising a drive unit 620 that may apply force to housing 126. Moving unit 618 may also include a sliding unit 622 that may permit housing 126 to slide in response to the movement force. Sliding unit 622 may comprise a caterpillar track unit, a wheeled unit, or other sliding unit. Pipe component 610 may be supported by a component moving unit that may enable the pipe component 610 to be moved with multiple degrees of freedom.

Figure 10:
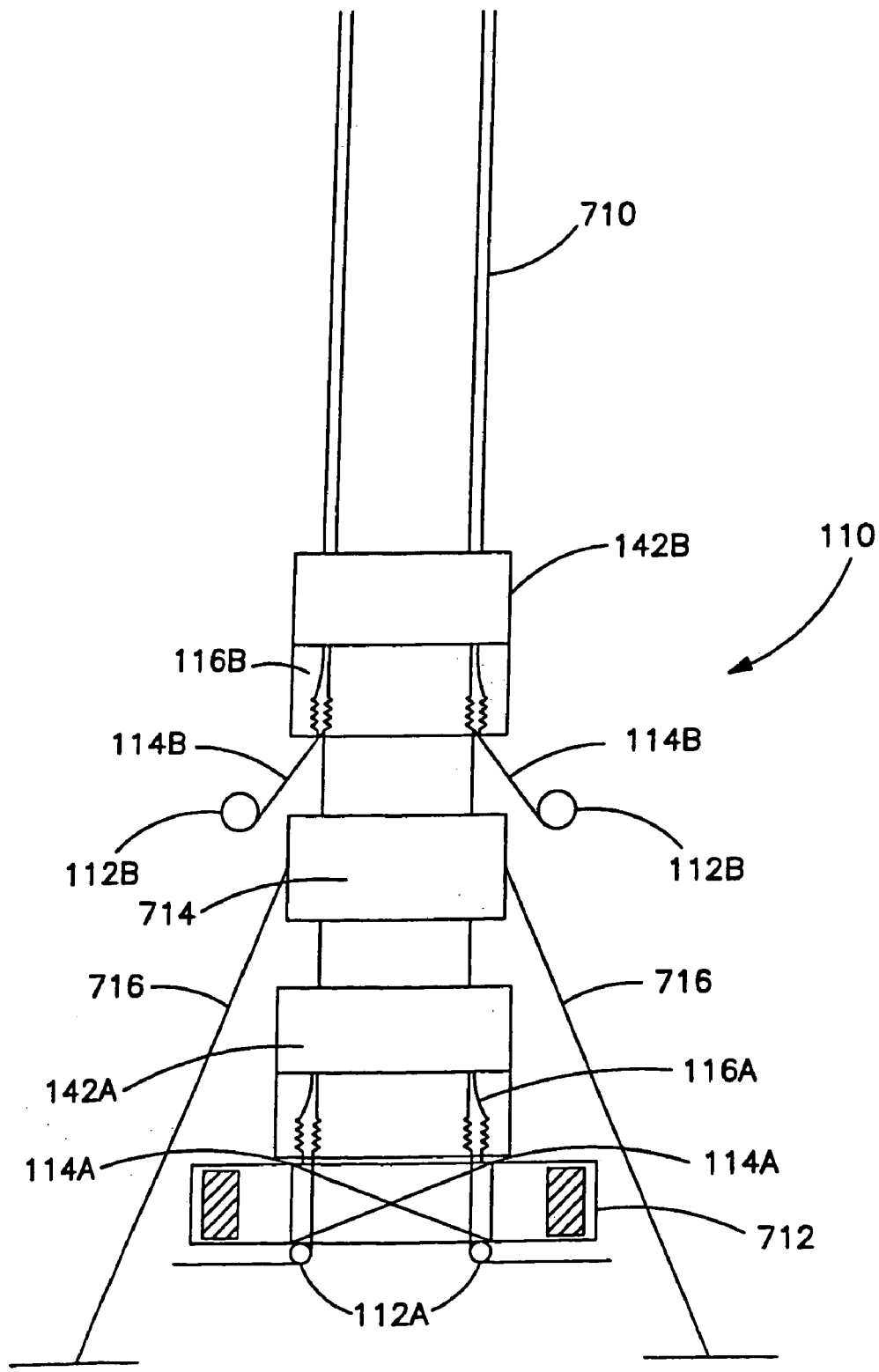
FIG. 10 illustrates an exemplary embodiment of a fiber lay-up apparatus.

FIG. 10 illustrates an exemplary embodiment of fiber lay-up apparatus 110 that may be employed in the manufacture of a pre-stressed component 710, such as a compression spar or other component. Fiber lay-up apparatus 110 may, in one configuration, employ three separate fiber lay-ups to produce pre-stressed component 710. Fiber lay-up apparatus 110 may include a base lay-up unit 712 that may lay-up a base material circumferentially about pre-stressed component 710.

Fiber lay-up apparatus 110 may include a primary fiber source 112A that may provide a continuous (or substantially continuous) primary feed of at least one fiber 114A. The primary feed of fiber 114A may be fed to a primary combination unit 116A that may combine the primary feed of fiber 114A with a matrix material, thereby creating a primary impregnated fiber. The primary impregnated fiber may then be fed into a primary shaping unit 142A, which may lay-up a primary output fiber onto pre-stressed component 710. The primary output fiber may be placed on top of the base material, and may be layed-up under a primary tension in a first direction with respect to pre-stressed component 710.

Fiber lay-up apparatus 110 may include a secondary fiber source 112B that may provide a continuous (or substantially continuous) secondary feed of at least one fiber 1 14B. The secondary feed of fiber 114B may be fed to a secondary combination unit 116B that may combine the secondary feed of fiber 114B with a matrix material, thereby creating a secondary impregnated fiber. The secondary impregnated fiber may then be fed into a secondary shaping unit 142B which may lay-up a secondary output fiber onto pre-stressed component 710. The secondary output fiber may be placed on top of the primary output fiber, and may be layed-up under a secondary tension in a second direction with respect to pre-stressed component 710 such that the primary and secondary tensions may counteract one another, thus establishing a tension differential that may give pre-stressed component 710 a desired rigidity.

Fiber lay-up apparatus 110 may include a holding unit 714 that may be supported by one or more holding unit supports 716. Holding unit 714 may secure pre-stressed component 710 in place, which may enable the primary and secondary output fibers to be layed-up with the desired primary and secondary tensions.

Figure 11:
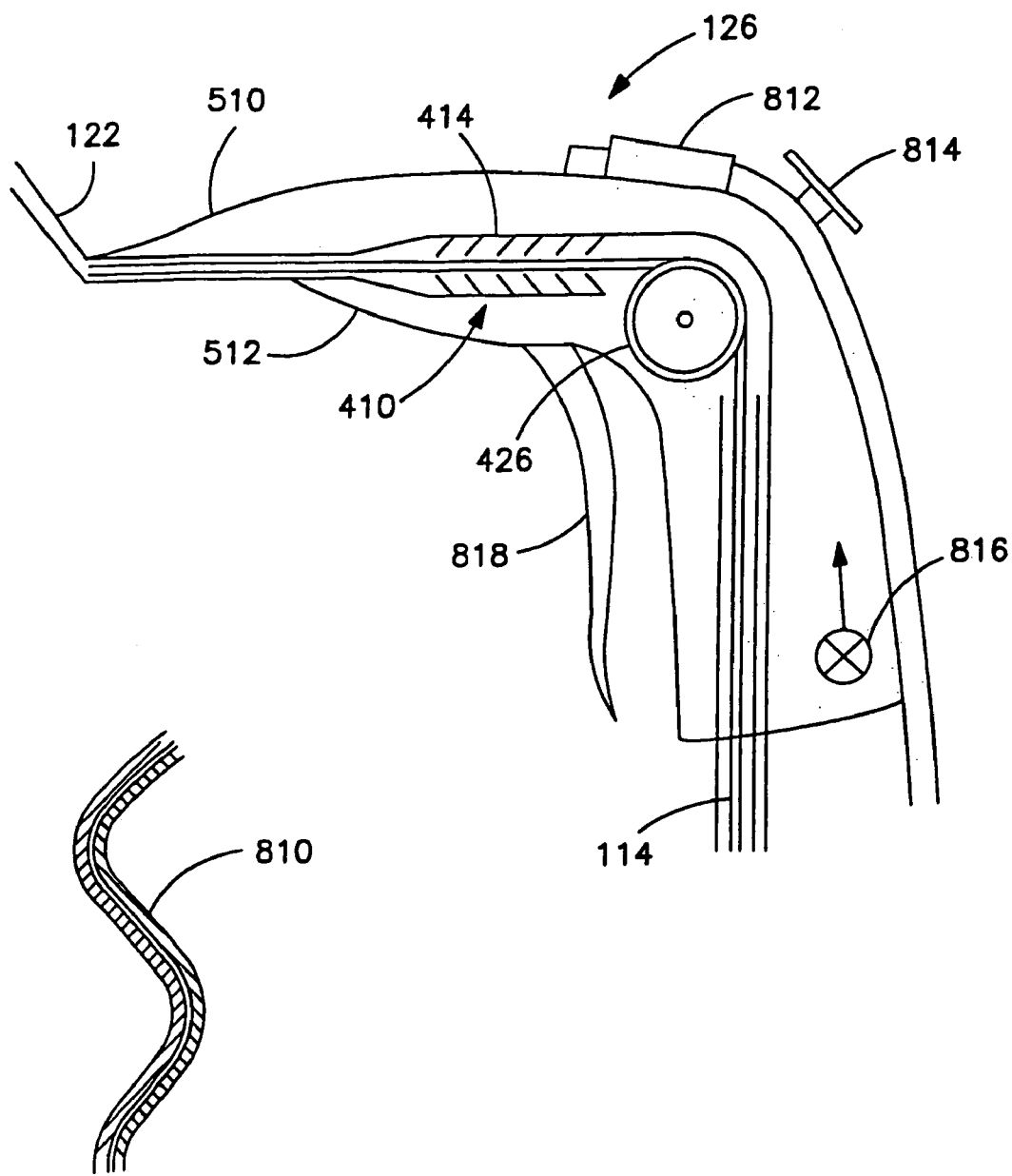
FIG. 11 illustrates an exemplary embodiment of a hand-held housing.

FIG. 11 illustrates an exemplary embodiment of fiber lay-up apparatus 110 that may include a handheld housing 126, which may provide include a grip. The grip may enable housing 126 to be manipulated by hand. The housing 126 may receive a feed of fiber 114 from a fiber output (not shown) via a fiber supply hose 810, and may include fiber feeding mechanism 426. Fiber feeding mechanism 426 may keep the feed of at least one fiber 114 under a desired tension and/or feed the feed of fiber 114 into and/or through a combination unit 410. Combination unit 410 may include combination chamber 414 for combining the feed of fiber 114 with a matrix material under pressure. Combination unit 410 may include a combination meter 812 that may display combination information such as, for example, a pressure in combination chamber 414, a flow or total amount of matrix material in combination chamber 414, or other information. Housing 126 may include a lay-up control 814 for controlling an aspect of the fiber lay-up process such as a matrix material flow or amount in combination chamber 414, a pressure in combination chamber 414, a flow or amount of fiber in the feed of fiber 114, a sensor implantation, or any other aspect of the fiber lay-up process. Housing 126 may include a shaping unit 142 that may include an upper shaping member 510 and/or a lower shaping member 512 that may allow for controlling a shape and/or placement of at least one output fiber 122. Housing 126 may include cutting unit 140 that may be controlled by lay-up control 814, or by another control such as a trigger control 818, which may be provided on the grip 808, or control 130. In some embodiments, housing 126 may include a curing element 816 for curing matrix material combined with output fiber 122.

In some embodiments of the invention, a fiber lay-up apparatus may be used to manufacture components of a particular system such as a truss system, or other system. The truss system, for instance, may provide a low weight, high strength truss system for use in a shelter, a gantry crane, a bridge, or in any other structure. The truss system may include no external nodes, thereby resolving all external forces internally.

Figure 12:
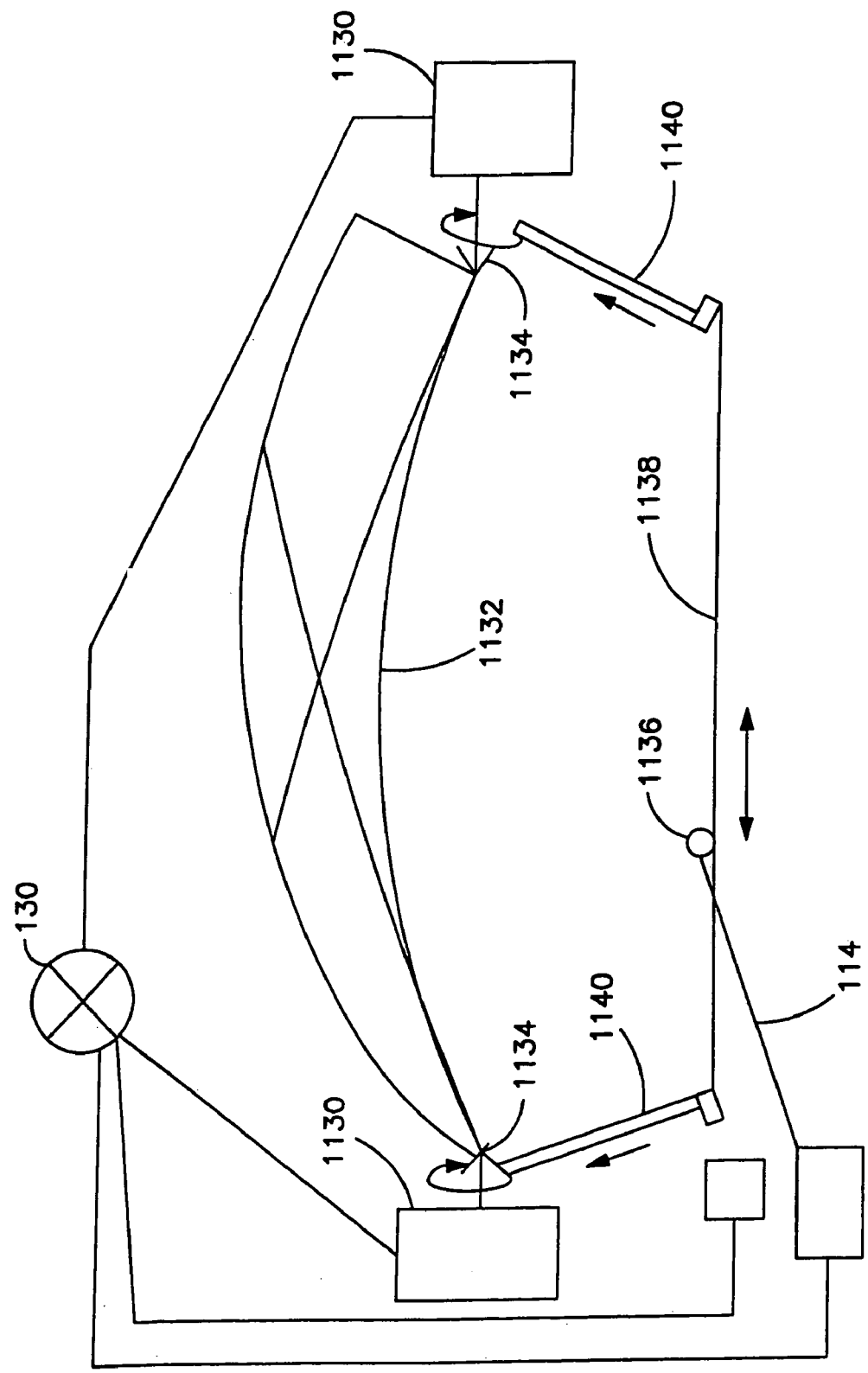
FIG. 12 illustrates an exemplary embodiment of a fiber lay-up apparatus.

FIG. 12 illustrates an exemplary embodiment of fiber lay-up apparatus 110. The fiber lay-up apparatus may include a spindle 1130 on each end of a mandrel 1132. Spindles 1130 may have one or more reversing pins 1134 for fiber 114. Fibers 114 may be supplied at a suitable tension by a low friction material guide 1136 that moves along a guide track 1138 which may extend the length of mandrel 1132 as mandrel 1132 is rotated according to a fabrication plan. At each end of guide track 1138, an excepting unit 1140 may be provided that transports fiber 114 from guide track 1138 to reversing pin 1134 on spindle 1130 while guide 1136 reverses, and is able to cover distance to the other end. This process may be repeated until all fibers 114 are laid up. The combination with a matrix material may be made on mandrel 1132 and may be done by thermo plastic films that are placed on either side of fibers 114 with an evacuating vacuum (not shown) applied at the fiber/film ends to keep the films on mandrel 1132.

Figure 13:
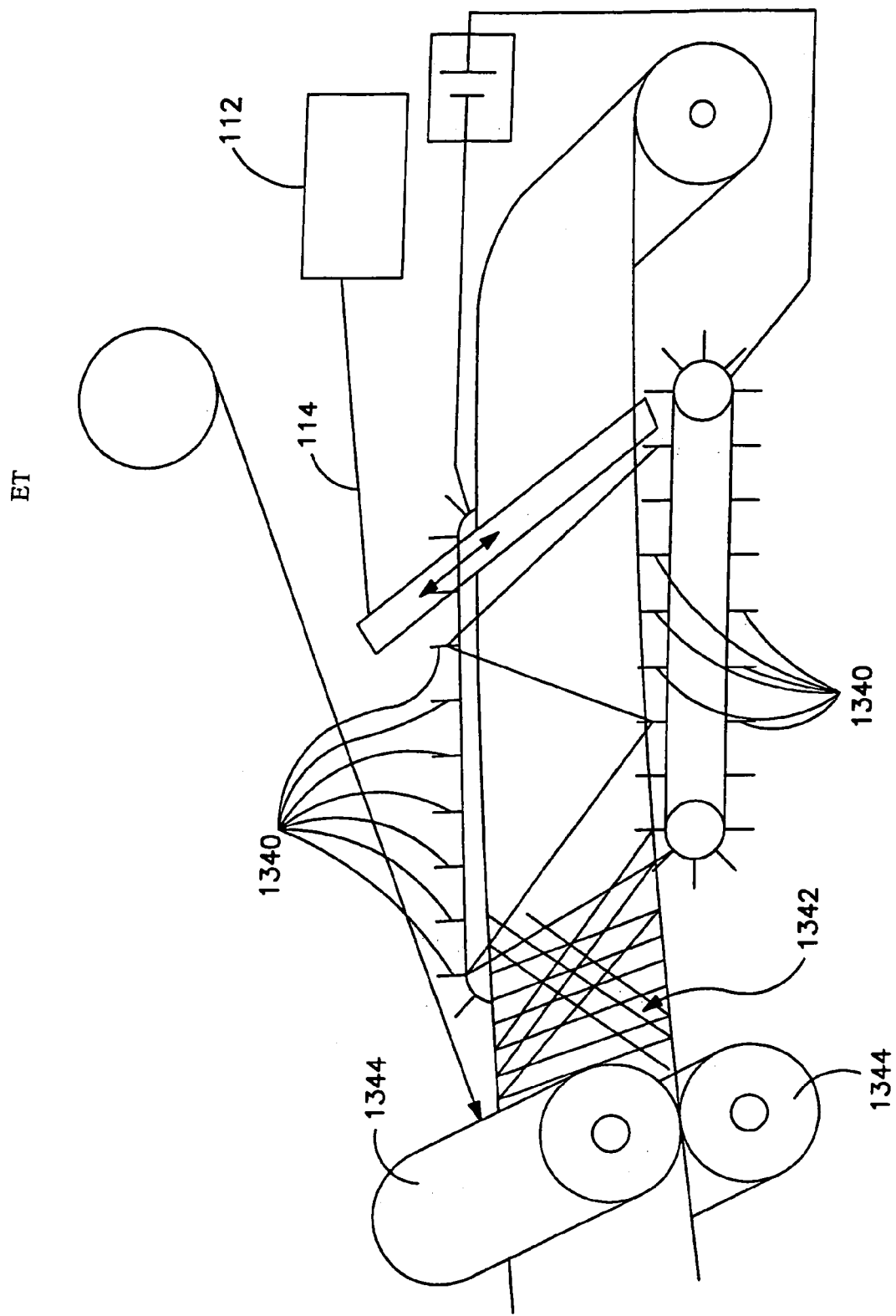
FIG. 13 illustrates an exemplary embodiment of a fiber lay-up apparatus.

FIG. 13 illustrates an exemplary embodiment of fiber lay-up apparatus 110, including introducing fibers 114 from fiber source 112 that travels back and forth over a matrix material that may be unrolled continuously. Fibers 114 may be reversed at reversing pins 1340 at each side of the matrix material width, and travel back and forth between reversing pins 1340. The speed of the matrix material passing by while fiber 114 is traversing the width to the next pin 1340 may determine the angle at which fiber 114 is included in a consolidated cloth 1342.

The consolidation may occur beginning with mating the matrix material with fiber 114 while inducing current to produce controlled heat in fibers 114 that may be used to activate the matrix combination around each fiber tow which is then pressed together by calendaring mechanisms 1344.

Figure 14C:
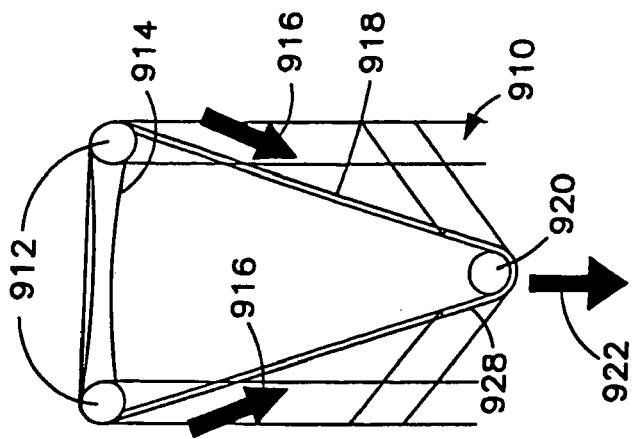
FIGS. 14A–14C illustrate exemplary embodiments of a truss system.
Figure 14A:
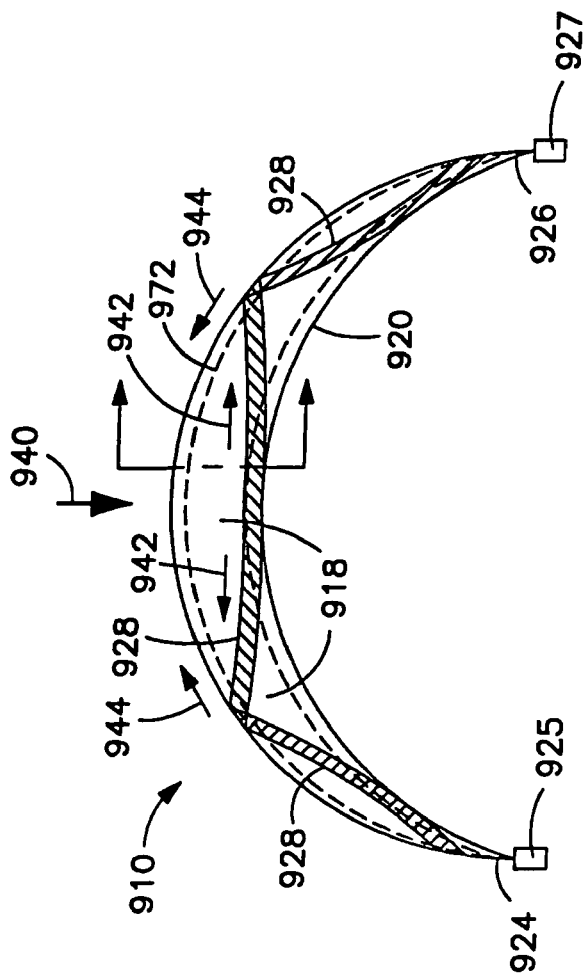
Figure 14B:
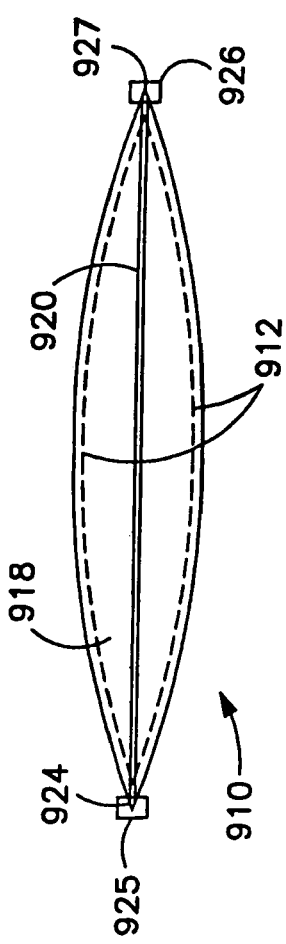

FIG. 14 (illustrated as FIGS. 14A–14C) illustrate an exemplary embodiment of a truss system 910 comprising one or more compression spars 912 that may be pre-stressed to provide an increased strength. The one or more compression spars 912 may be separated by a compression web 914, and a pre-stressing force (illustrated by arrows 916) may be applied to the one or more compression spars 912 by a sleeve 918. Truss system 910 may further comprise a tendon 920 that, when tensioned, may provide a tensioning force (illustrated by arrow 922) creating pre-stressing force 916 that may be applied to the one or more compression spars 912 via sleeve 918. Truss system 910 may be constructed such that the one or more compression spars 912 and tendon 918 may come together at a first end 924 (which may include a first base 925), and a second end 926 (which may include a second base 927). Thus, truss system 910 may not provide any external nodes and may therefore resolve all external forces on truss system 910 internally, tangential to tendon 920. Sleeve 918 may be reinforced with at least one reinforcement band 928 that may run tangential (or substantially tangential) to tendon 920. Reinforcement band 928 may reinforce truss system 910 when an external force is applied to truss system 910, causing an increased stress on truss system 910 tangential to tendon 920.

FIG. 14A, illustrates how truss system 910 may resolve an external force, represented by arrow 940, on truss system 910. External force 940 may be resolved in part by one or more tensioning resolution forces, represented by arrows 942, applied tangential to tendon 920. Tensioning resolution force 942 may be absorbed, at least in part, by reinforcement band 928. External force 940 may also be resolved in part by one or more compression resolution forces, represented by arrows 944, applied tangential to compression spars 912.

Figure 15:
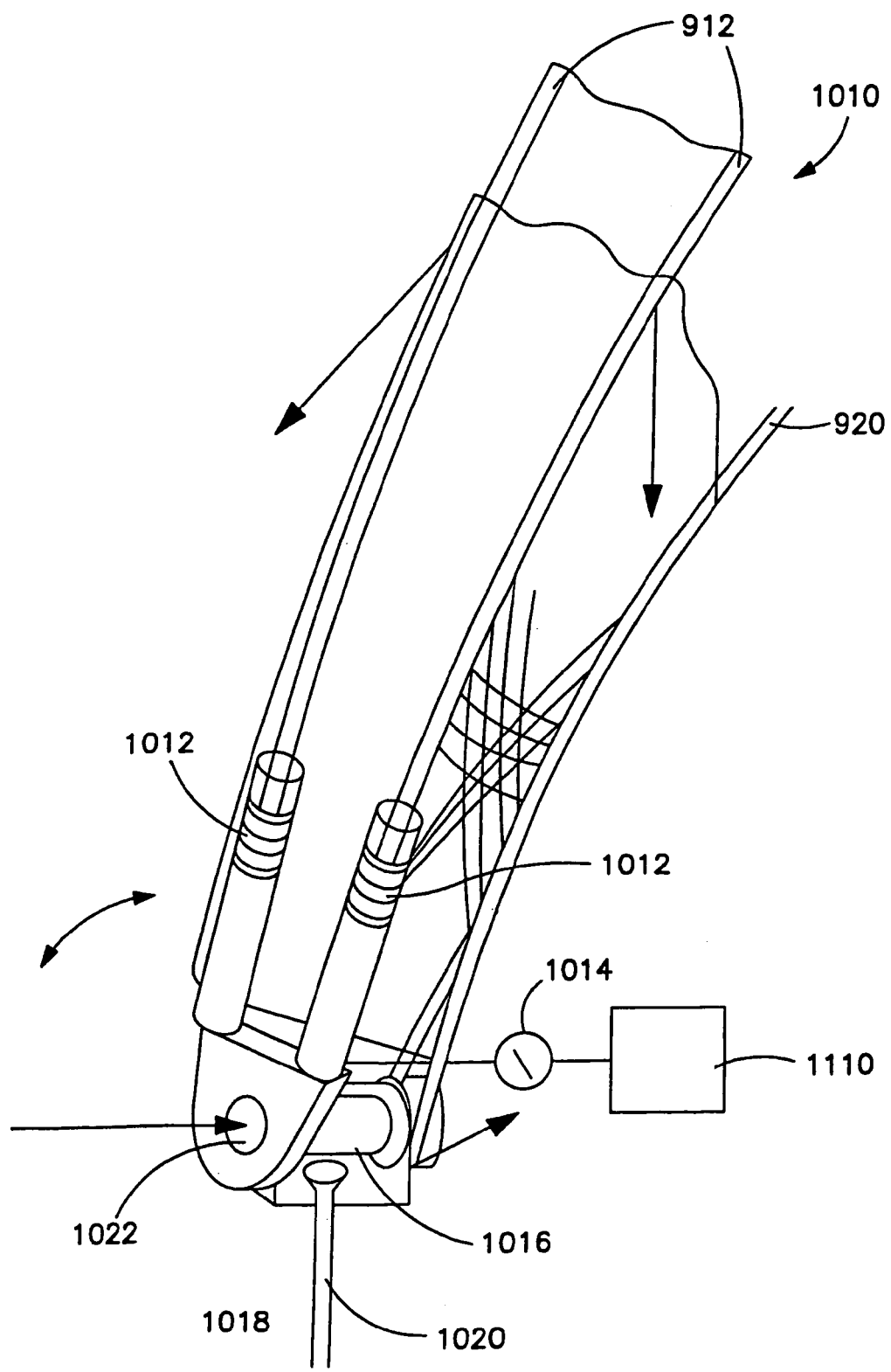
FIG. 15 illustrates an exemplary embodiment of an end of a truss system.

FIG. 15 illustrates an exemplary embodiment of an end 1010 of truss system 910. In some embodiments of the invention, tendon 920 may be tensioned and/or held in tension by a tensioning system. The tensioning system may comprise a hydraulic system. The hydraulic system may include a hydraulic piston 1012 that engages tendon 920 to supply a tensioning force 922 to tendon 920. The hydraulic system may further include a hydraulic fitting 1014 where a hydraulic control system (not shown) may include controls for increasing and/or decreasing tensioning force 922. Alternatively, the hydraulic control system may comprise a tensioning force meter that may display tensioning force 922 provided by hydraulic piston 1012, and/or any other hydraulic control system feature.

According to an embodiment of the invention, the end 1010 of truss system 910 may further include a base 1016 that may provide a foundation for truss system 910. Base 1016 may be anchored to a surface 1018 by an anchoring system that may include an anchor bolt 1020. Alternatively, multiple anchor bolts may be utilized as well as, for example, an anchoring system utilizing dead weight such as at least one sandbag; a connection to a pre-existing anchor; a rubber seal; or other system to anchor truss system 910. Base 1016 may further enable truss system 910 to be attached to base 1016 via a pivot pin 1022 thus enabling truss system 910 to pivot.

Truss system 910 may further be monitored by a truss monitoring system. The truss monitoring system may include at least one sensor located proximal to (or embedded in) truss system 910 to provide information about the structural integrity of truss system 910.

Figure 16:
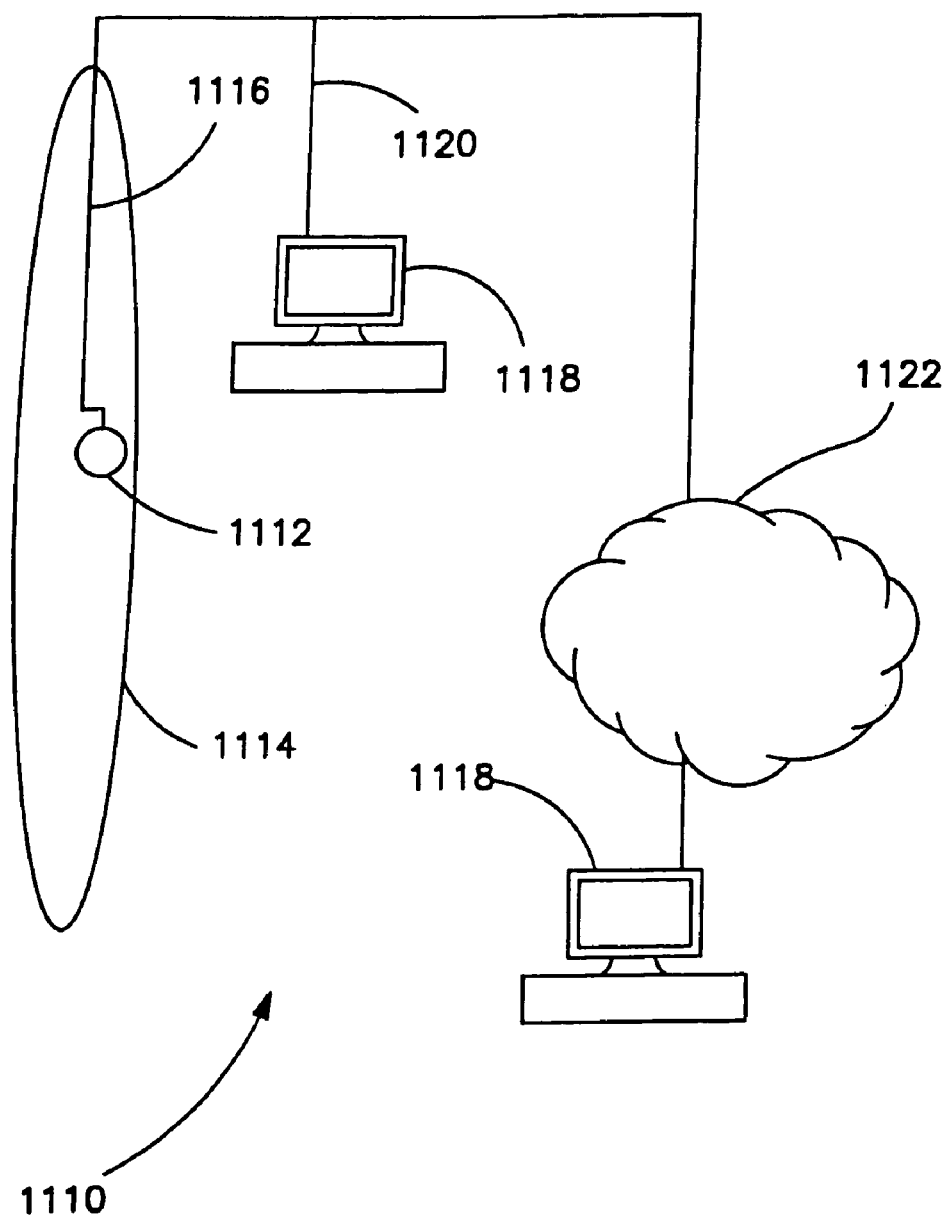
FIG. 16 illustrates an exemplary embodiment of a truss monitoring system.

FIG. 16 illustrates an exemplary embodiment of a truss monitoring system 1110 including a sensor 1112 that may be located proximal to (or embedded in) a component 1114 of truss system 910. Sensor 1112 may measure information such as component tension, component compression, component strain, or other information. The information acquired by sensor 1112 may be transmitted by an information-carrying fiber 1116 that may be embedded in component 1114, and may comprise an optical fiber or other type of information carrying-fiber. The information acquired by sensor 1112 may be transmitted to a computer 1118 (or other processor) that may include software capable of receiving and displaying the information which may convey the structural integrity of truss system 910 to a user. Computer 1118 may be connected to information carrying-fiber 1116 by a direct connection 1120, over a network 1122, or via any other connection.

It should be recognized that the recitation of component 1114, sensor 1112, and information-carrying fiber i 16 are exemplary in nature, and are not meant to limit truss monitoring system 1110 in any way. For example, one or more sensors 1112 may be located at (or embedded in) one or more components 1114 of truss system 910. Similarly, information acquired by sensor 1112 may be transmitted to one or more computers 1118 by one or more information carrying wires 1116. Further, truss monitoring system 1110 may yield a more or less comprehensive representation of the structural integrity of truss system 910 based on the number and combination of the elements used to create truss monitoring system 1110.

Figure 17:
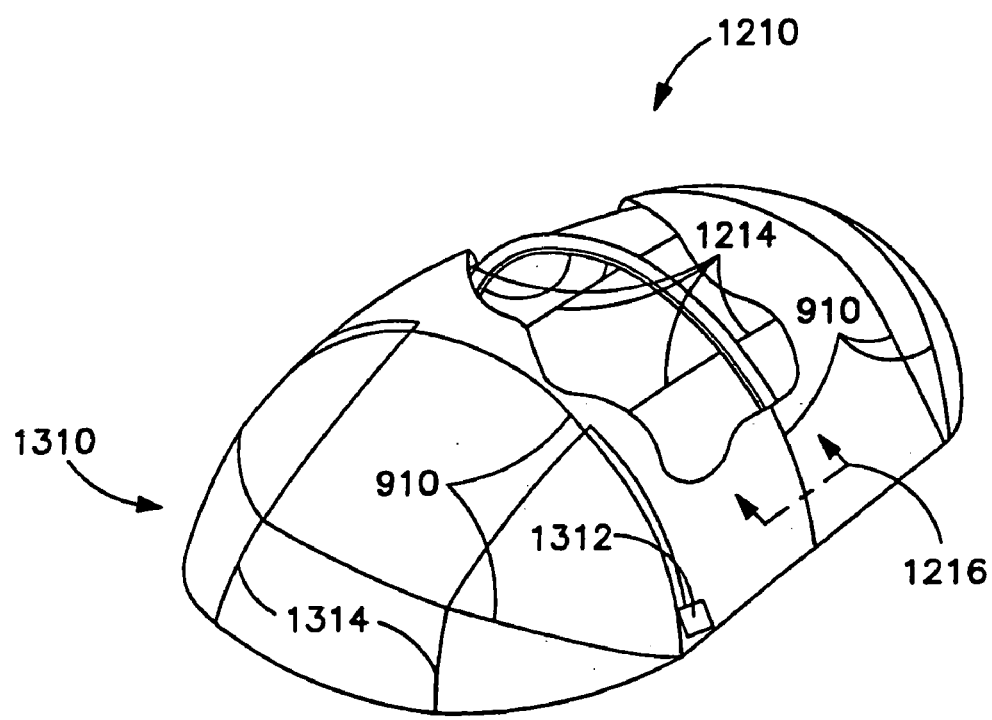
FIG. 17 illustrates an exemplary embodiment of a shelter system.

In some embodiments of the invention, truss system 910 maybe used as a component of a shelter system. FIG. 17 illustrates an exemplary embodiment of a shelter system 1210 that may include a plurality of truss systems 910 for supporting a covering system. The embodiment of FIG. 17 is illustrated with a portion of the covering system removed, thus revealing further features of shelter system. The covering system may include a plurality of covering panels 1212, as well as a plurality of truss braces 1214 that may connect and/or provide additional support for the plurality of truss systems 910.

Figure 18:
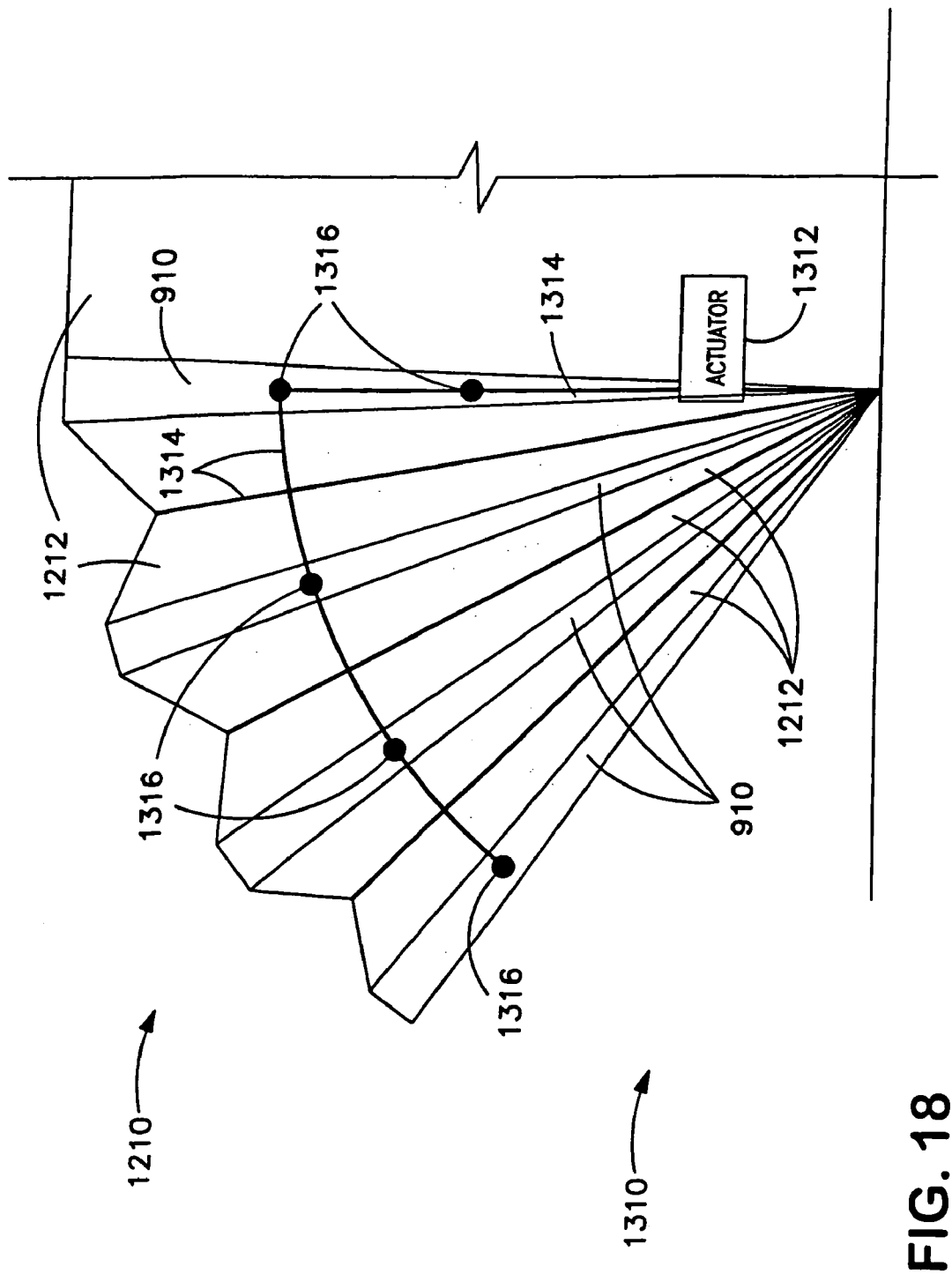
FIG. 18 illustrates an exemplary embodiment of an opening system of a shelter system.

In some embodiments of the invention, shelter system 1210 may include an opening system. FIG. 18 illustrates an exemplary embodiment of an opening system for opening an end 1310 of shelter system 1210. The opening system may provide access to the interior of shelter system 1210. The opening system may further comprise an opening actuation system 1312 for opening end 1310 of shelter system 1210 by retracting or releasing an opening line 1314 that may be guided by a plurality of sheaves 1316. The opening actuation system 1312 may include a winch system, a manual pulley system, or other system.

Figure 19:
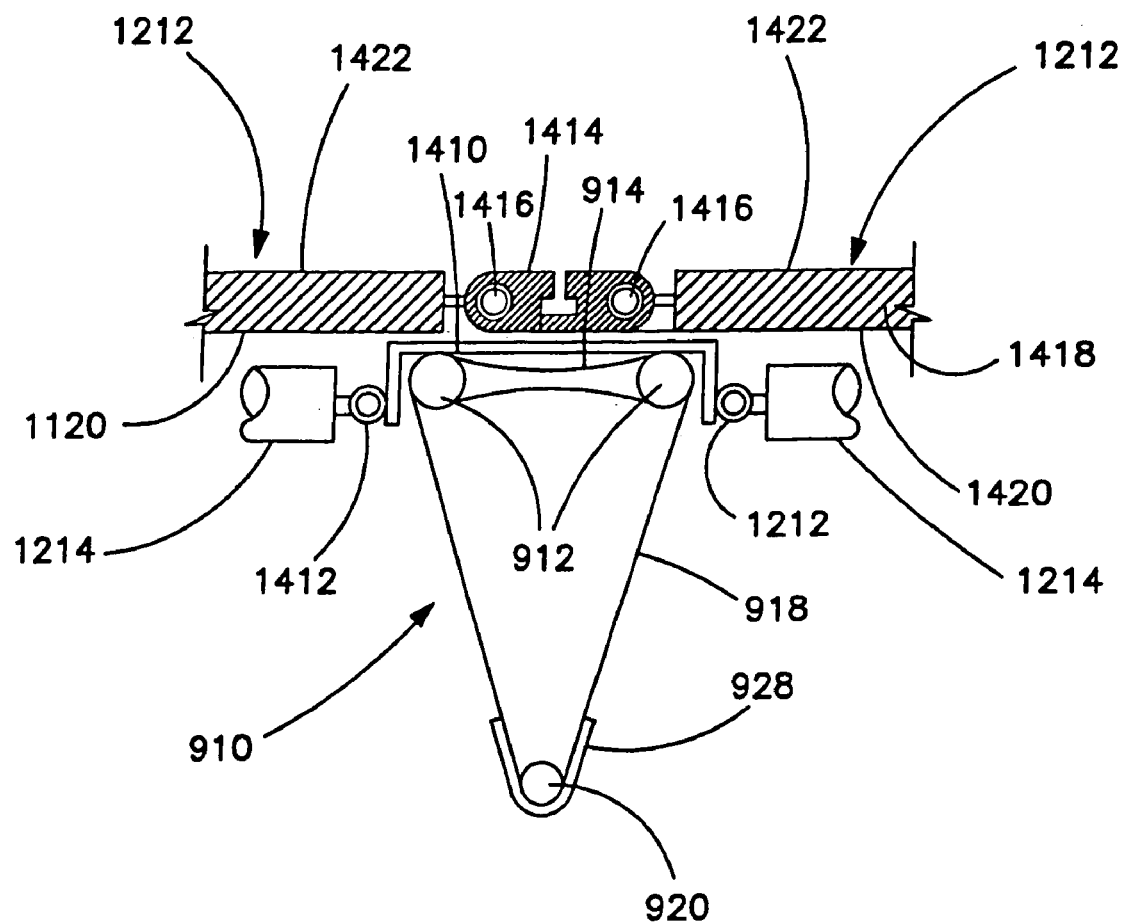
FIG. 19 illustrates an exemplary embodiment of a cross section of an exemplary embodiment of a shelter system.

FIG. 19 illustrates a cross-section of shelter system 1210 taken along a section line 1216. Referring to FIG. 19, shelter system 1210 may include a mounting bracket 1410 that enables covering panels 1212 and truss braces 1214 to be secured to truss system 910. Mounting bracket 1410 may include at least one pivot pin 1412. Pivot pin 1412 may permit truss braces 1214 to pivot with respect to truss system 910. Mounting bracket 1410 may further include a covering panel supporting track 1414 that may guide and/or secure in place at least one covering panel supporting member 1416 which may be fixed to one or more of covering panels 1212. Covering panel supporting track 1414 may comprise any track, such as a keder track, or other track. Similarly, cover supporting member 1416 may comprise any member, such as a keder, a guide member, or other member. Covering panels 1212 may include a layer of insulation 1418 that may be positioned proximal to an inner layer 1420, and/or an outer layer 1422. Inner layer 1420 may include a reflective material to increase the brightness of a space enclosed by shelter system 1210. Outer layer 1422 may include certain properties that increase the functionality of shelter system 1210, such as waterproofing, camouflage, tear resistance, or any other desired properties. It should be recognized that although in the embodiment illustrated the covering panels 1212 are illustrated as separate and distinct components, multiple covering panels 1212 may be formed integrally as a single covering section, and that the covering system may include one or more single covering sections made up of multiple covering panels.

In some embodiments of the invention, the covering system may include a plurality of covering layers, and may provide a separation between each of the covering layers for insulation.

Figure 20:
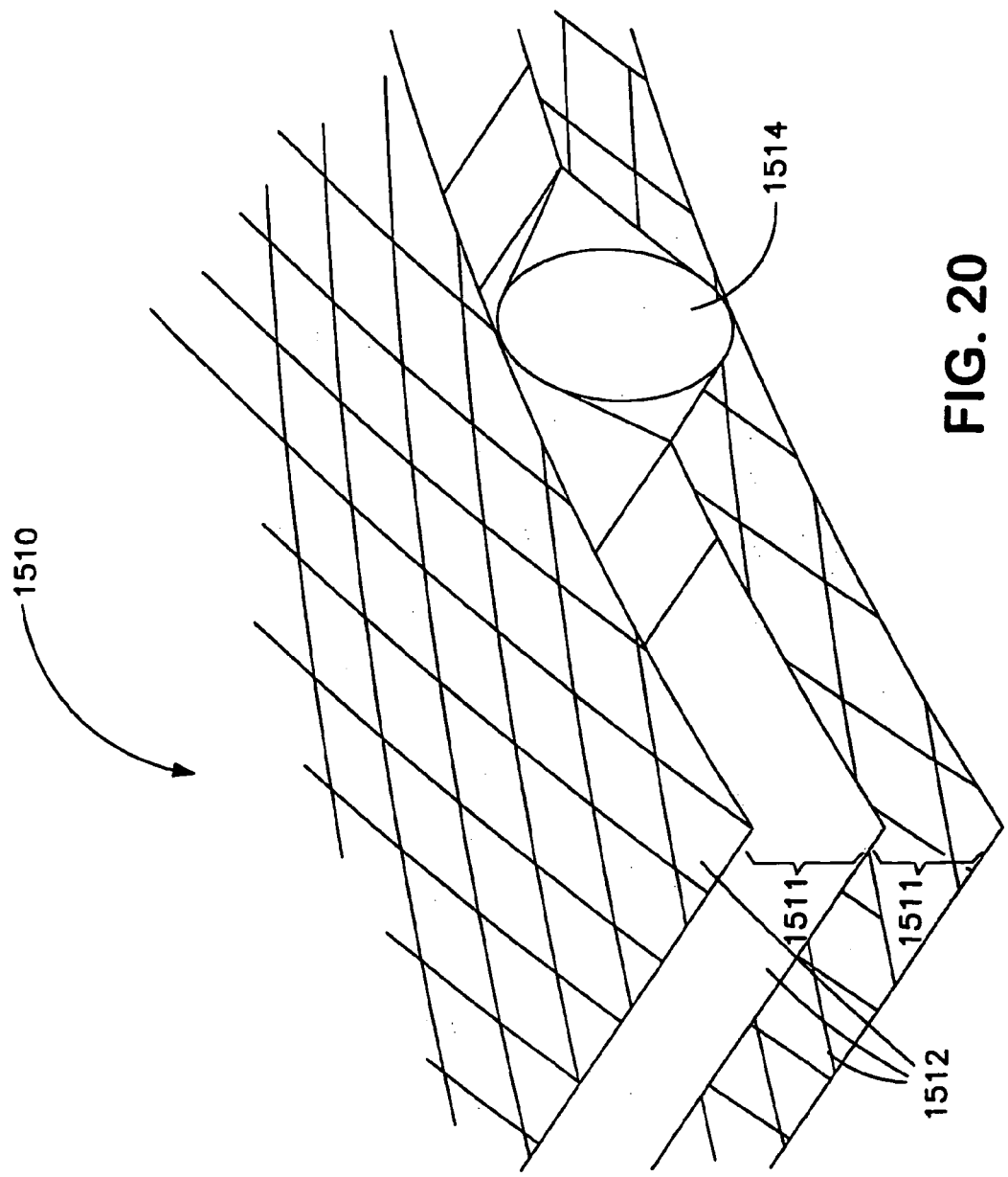
FIG. 20 illustrates an exemplary embodiment of a covering system of a shelter system.

FIG. 20 illustrates an exemplary embodiment of a portion of a covering system 1510 that may include a separation 1511 between a plurality of covering layers 1512. Separation 1511 between covering layers 1512 may be provided by a separation strip 1138. Separation strip 1138 may comprise an inflatable strip, a strip of foam, or other strip. Separation strip 1138 may further be heated for facilitating snow melt and run off for a shelter system located in a cold climate. It should be recognized that covering system 1510 may include a plurality of separation strips 1138 positioned throughout the complete covering system.

In some embodiments of the invention, shelter system 1210 may be disassembled and/or broken down for transportation (or relocation) to a new location, for storage, or for a variety of other purposes. When disassembled, shelter system 1210 may be packed into a volume, referred to as a cargo footprint. In various embodiments, the cargo footprint of shelter system 1210 may be minimized because the one or more compression spars 912 may comprise the only rigid component of the shelter system.

Figure 21:
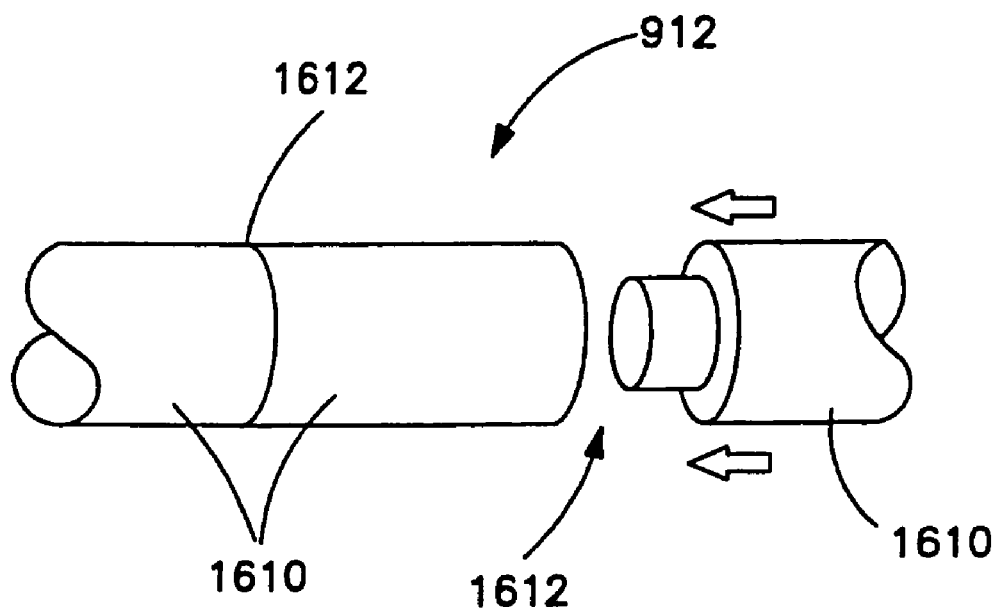
FIG. 21 illustrates an exemplary embodiment of a compression spar connection.

FIG. 21 illustrates an exemplary embodiment wherein the cargo footprint of a shelter system may be further minimized by reducing compression spar 912 to a set of connecting compression spar sections 1310 that may fit together at section connections 1312. Section connections 1312 may include a slotted male/female connection, a screw-in connection, or other connection.

Figure 22A:
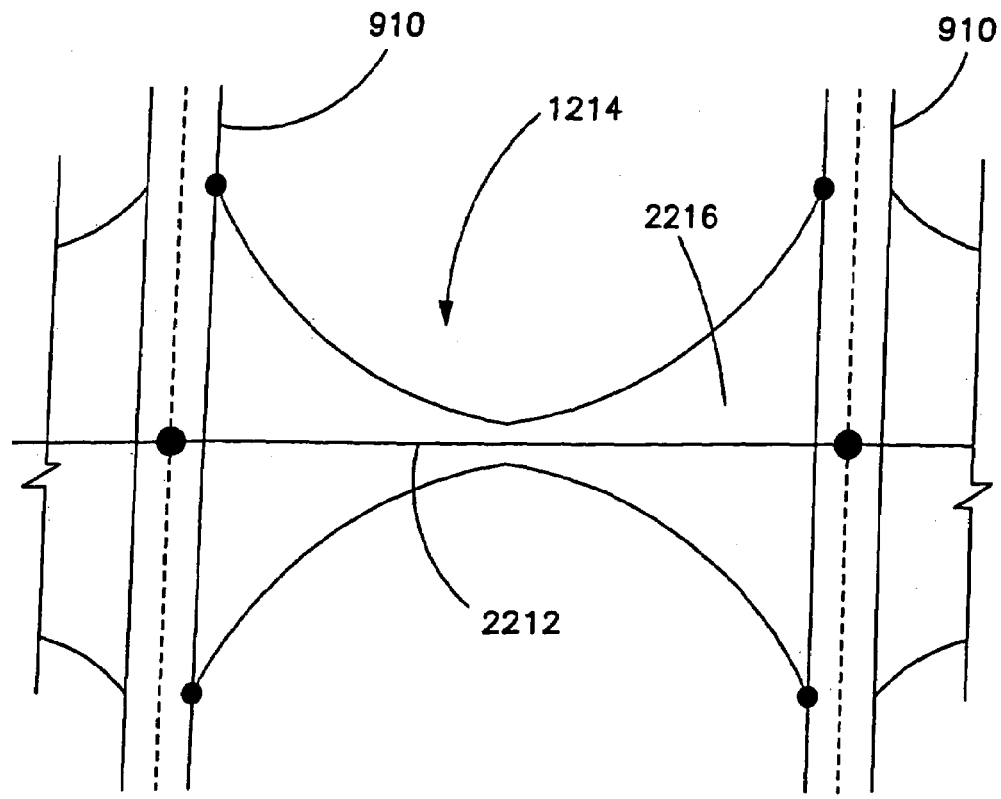
FIG. 22 illustrates an exemplary embodiment of a truss brace.
Figure 22B:
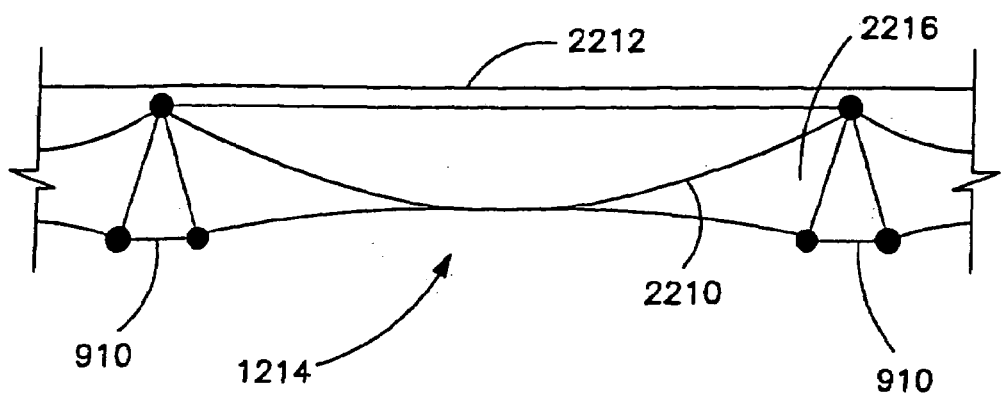

FIG. 22 illustrates an exemplary embodiment of truss brace 1214. Truss brace 1214 may include a brace compression spar 2210, a brace tendon 2212, and a brace sleeve 2216. Truss brace 1214 may be operatively fixed to two or more truss systems 910 to provide added stability to truss systems 910, or to provide an additional enhancement.

Figure 23:
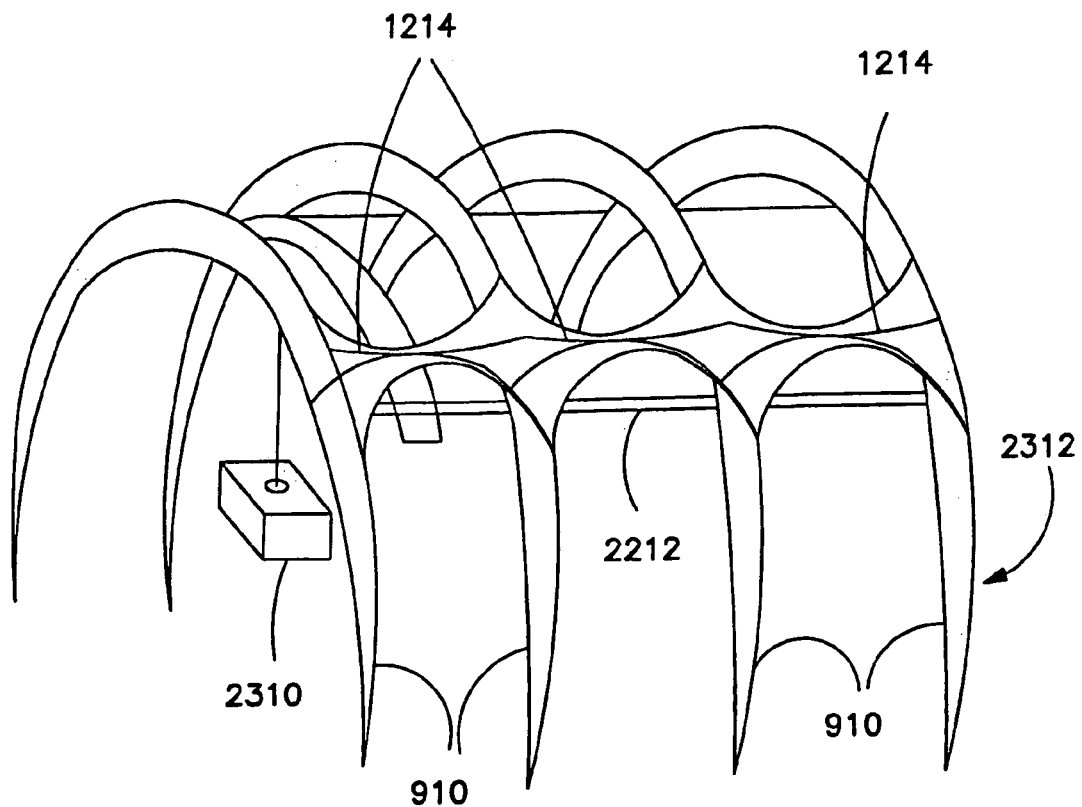
FIG. 23 illustrates a perspective view of a gantry crane system, according to a an embodiment of the invention.
Figure 24:
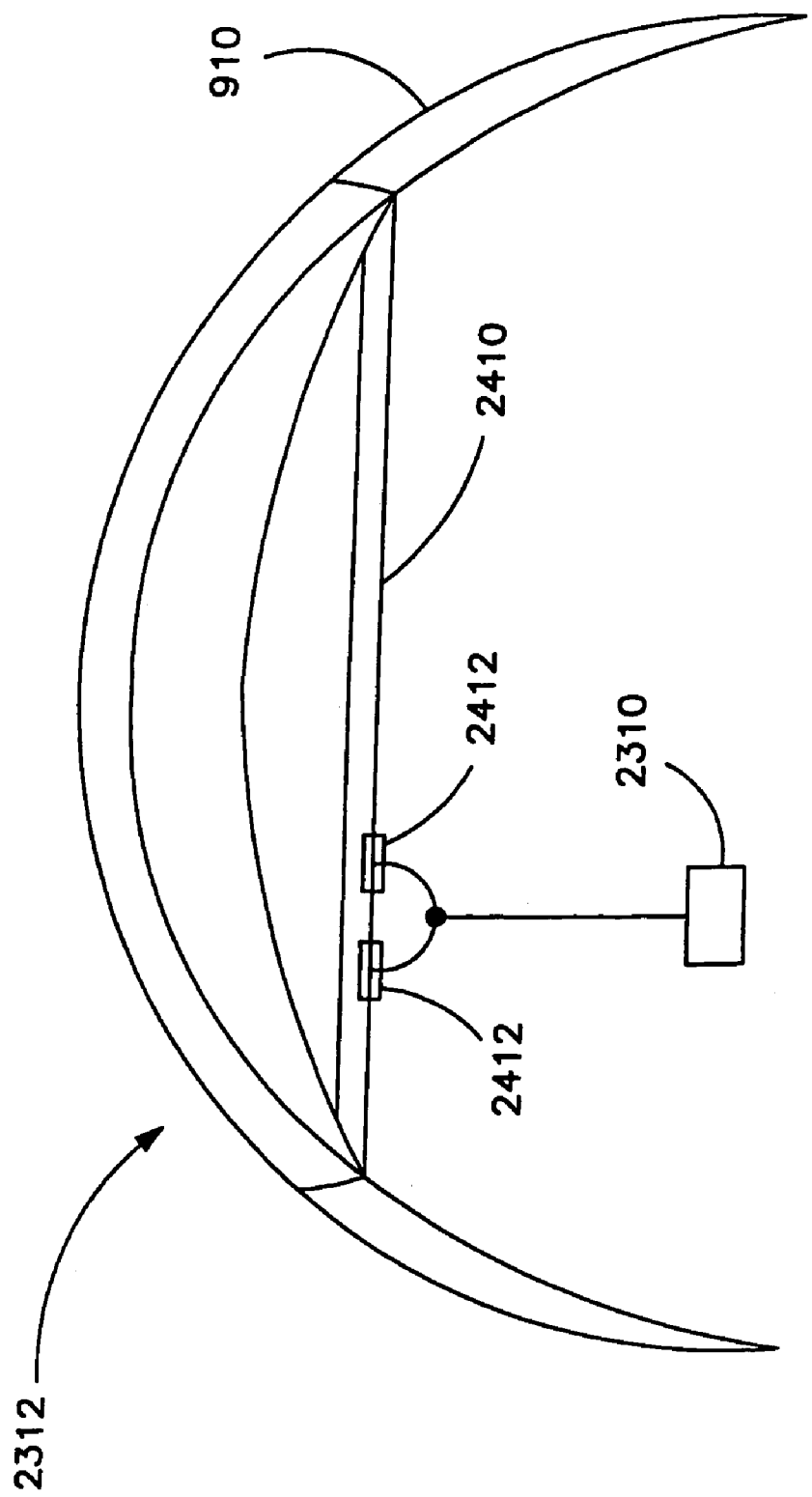
FIG. 24 illustrates an elevation a gantry crane system, according to an embodiment of the invention.

FIGS. 23 and 24 illustrate an exemplary embodiment of a plurilty of truss systems 910 included in a gantry crane system 2312. Gantry crane system 2312 may include a plurality of truss braces 1214, and may support a load 2310. Gantry crane system 2312 may include a gantry crane tendon 2410 that may serve as a guide for one or more gantry crane tracks 2412. Gantry crane tracks 2412 may enable the load to be moved along gantry crane tendon 2410.

FIG. 25 illustrates an embodiment of a covering 2510 tailored to shelter system 1210. Covering 2510 may be packed such that it can be uncovered by winching action. This may be accomplished via one or more skids 2512 incorporated in the transportation burden that may be folded such that the covering is folded back and forth with skids 2512 resting parallel tightly next to each other.

According to an embodiment of the invention, skids 2512 may double as doorways for shelter system 1210, thereby reducing the transportation burden. They may comprise boxes of preferably lightweight sandwich-type material open on two opposing sides 2514, and may have a hinged covering section 2516 that can be locked in place. Skids 2512 may also have provisions for castor rollers. Skids 2512 may be pulled out standing on edge in a crate and aligned in position. Skids 2512 may then be laid down on their side and opened with covering section 2516 facing away from shelter system 1210. Shelter system 1210 may include one or more hoisting ropes 2518 preferably configured as a continuous belt running around a winching drum which enables bidirectional control. The covering 2510 may be attached to hoisting rope 2518 by arresting clips that are pre-positioned and may keep covering 2510 taut while hoisting. The hoisting may be done by activating the winching action perpendicular to skid 2512 alignment which may preferably be connected by shaft or tube or other means to other perpendicular hoisting ropes 2518.

In certain implementations, a blow-out by wind caught by a hoisted cover section may only effect a section that is not fully hoisted. It may be advantageous to keep the ends running lengthwise in the direction of placed skids 2512 under control over a large span as would be in the case of eyelid openings that also are to be covered with covering 2510. This may be achieved by placing a second winching position 2520 perpendicular to a previous one, with a harness that runs through a snatch block like sliding connection to hoisting rope 2518 attached to winch 2522. Each side may preferably have one line going to winch 2522. One or more winches or tensioning systems may tighten hoisting ropes 2518 from each end simultaneously while covering 2510 is hoisted over shelter system 1210. Once covering 2510 is in place on the opposite side, the tightening of lines at each fix point at, for instance, truss bases are entered through a clamping device and tightened by the same or a different winch used for hoisting. After tying down the opposite side, the lengthwise eyelid door trusses may be engaged with the covering. This may be accomplished via self-engaging locking latches. These may engage in the correct truss and fit the covering to a particular truss. The winches used in the hoisting of the covering may then be used as eyelid door openers with one line performing tightening and opening of the eyelid doors.

The tear down of covering 2510 may be accomplished by reengaging the winches and unlocking the tie downs. Covering 2510 is then under constant release keeping covering 2510 tight, while pulling it over shelter system 1210, while disengaging the attachments to hoisting ropes 2518 and fixing them neatly back to skid 2512 and/or base. Covering 2510 may be pulled by hand tight in each fold that the attachment points on hoisting ropes 2518 define. Covering 2510 may periodically be tampered down by the cover panel of skids 2512 allowing for neat compact insertion of the folded covering 2510. Skids 2512 are then closed and picked up against shelter system 1210 where they may then be winched together to fold neatly in parallel and placed next to one another to be inserted into the transportation crate.

Figure 26A:
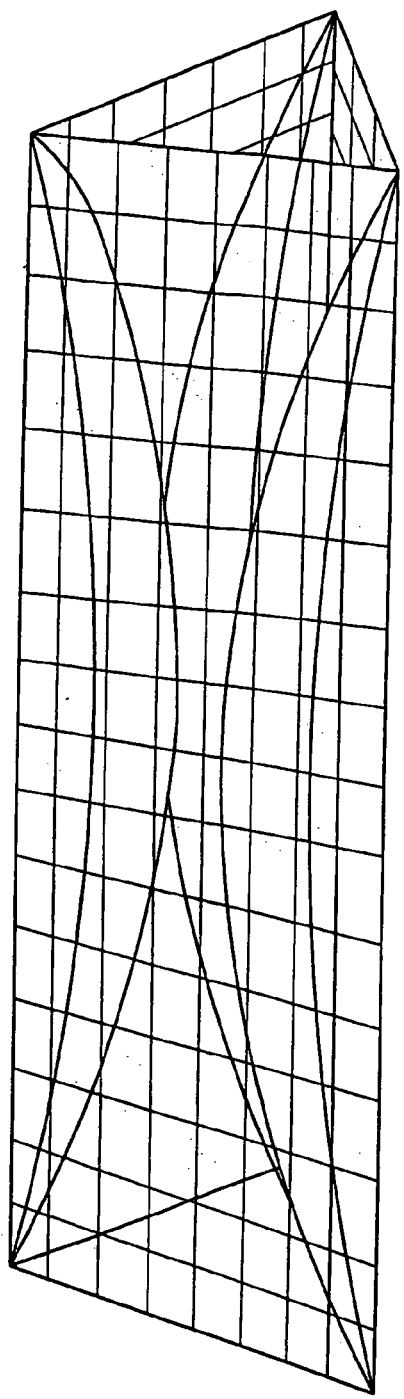
FIG. 26 illustrates various truss systems, according to an embodiment of the invention.
Figure 26B:
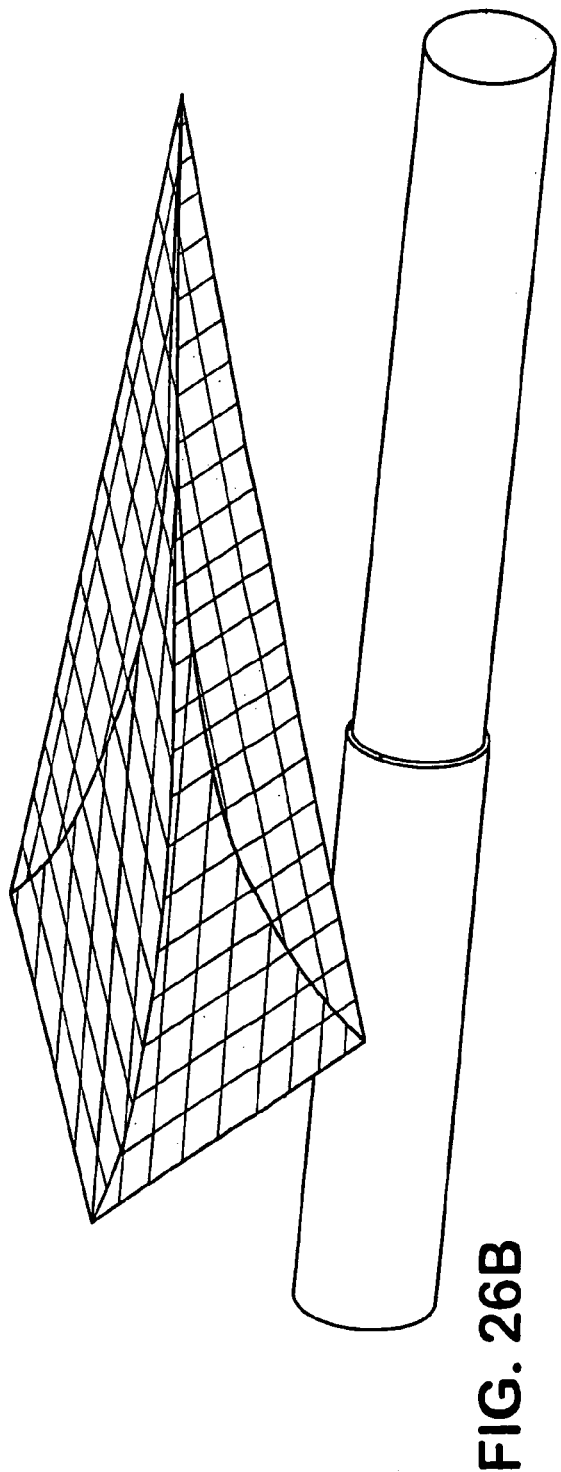
Figure 27A:
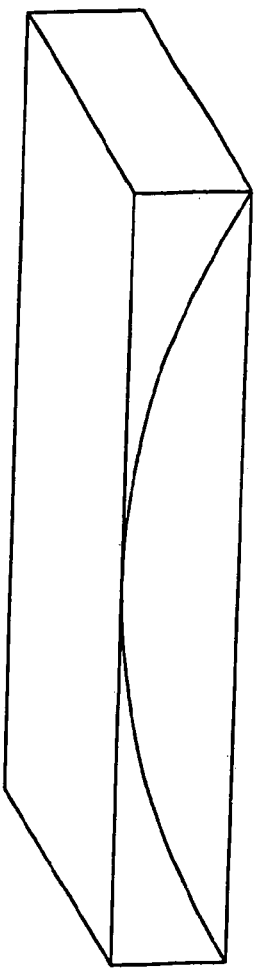
FIG. 27 illustrates various truss systems, according to an embodiment of the invention.
Figure 27B:
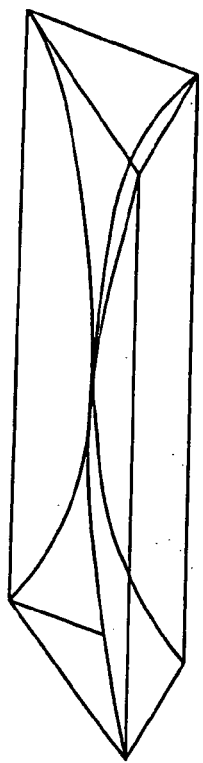
Figure 27C:
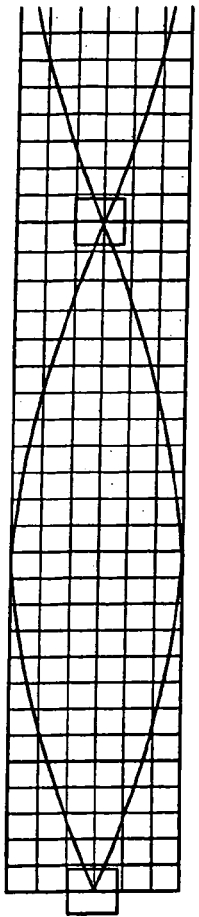
Figure 27D:
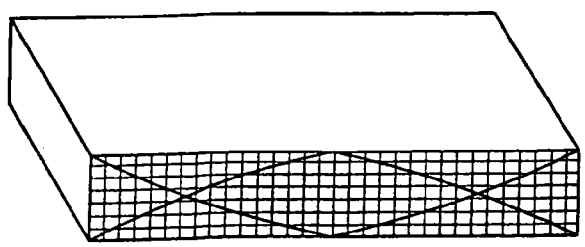
Figure 27E:
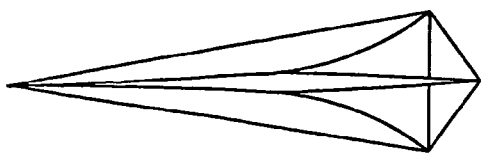

FIGS. 26 and 27 illustrate exemplary embodiments of truss systems that may include compressions spars, tendons, and sleeves.

Athough the apparatus and method disclosed herein have been described with reference to a truss system which may be used in, among other things, a shelter system, other applications do exist. For example, the apparatus and method may be used to manufacture components that include any number of enhanced features including, but not limited to, a high strength to weight ratio, a high directional strength, a higher directional strength in a first direction and a lower directional strength in a second direction, or a desired coefficient of thermal expansion. Some components manufactured by the fiber lay-up apparatus may include a compression spar, a webbing, a tendon, a fabric matrix, a tube, a rod, or virtually any other component.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for processing fiber to produce fiber composite components, the system comprising:
    a motive force mechanism for feeding at least one fiber tow to be processed through the system;
    a combination unit in which a portion of the at least one fiber tow can be combined with at least one matrix to produce a first fiber portion;
    a shaping unit for shaping the first fiber portion;
    a housing that is positionable with respect to a component being produced by the system during production of the component; and
    a position determining system that determines the position of the housing,
    wherein the motive force mechanism, the combination unit, and the shaping unit are carried on the housing, and
    wherein the position determining system implements laser triangulation.

2. The system of claim 1, wherein the combination unit comprises seal members that provide a seal for the combination unit and a conduit through which matrix can be delivered to the at least one fiber tow.

3. The system of claim 1, wherein the combination unit provides a non-contact motive force to the at least one fiber tow.

4. The system of claim 1, further comprising a splicing unit for splicing a first fiber tow to a second fiber tow as fiber is being fed through the system.

5. The system of claim 1, wherein the shaping unit is adapted to enable UV curing of the at least one matrix by the shaping unit.

6. The system of claim 1, further comprising a tension mechanism to maintain the at least one fiber tow under tension as the at least one fiber tow is fed through the system to pre-stress the at least one fiber tow.

7. The system of claim 1, further comprising a housing actuator that engages the housing, the housing actuator being movable to actively position the housing.

8. The system of claim 1, wherein the shaping unit comprises a shaping member that is actively actuatable to shape the first fiber portion.

9. The system of claim 1, further comprising a control unit that is capable of dynamically controlling one or more aspects of the motive force mechanism and one or more aspects of the combination unit.

10. The system of claim 9, wherein the one or more aspects of the motive force mechanism that can be dynamically controlled by the control unit comprises one or more of a tension of the at least one fiber tow, a feed rate of the at least one fiber tow, the tension of the first fiber portion, or a feed rate of the first fiber portion.

11. The system of claim 9, wherein the one or more aspects of the combination unit that can be dynamically controlled by the control unit comprises one or more of a pressure of the at least one matrix within the combination unit, a modulation of the pressure of the at least one matrix within the combination unit, or a composition of the at least one matrix.

12. The system of claim 9, further comprising a housing actuator that engages the housing, the housing actuator being movable to actively position the housing, wherein the control unit controls the movement of the housing actuator.

13. A system for processing fiber to produce fiber composite components, the system comprising:
    a motive force mechanism for feeding at least one fiber tow to be processed through the system;
    a combination unit in which a portion of the at least one fiber tow can be combined with at least one matrix to produce a first fiber portion;
    a shaping unit for shaping the first fiber portion;
    a housing that is positionable with respect to a component being produced by the system during production of the component; and
    a position determining system that determines the position of the housing,
    wherein the motive force mechanism, the combination unit, and the shaping unit are carried on the housing, and
    wherein the position determining system implements sonar triangulation.

* * * * *

UNITED STATES PATENT AND TRADEMARK OFFICE
CERTIFICATE OF CORRECTION

| | | |
|---|---|---|
| PATENT NO. | : 7,093,638 B2 | Page 1 of 1 |
| APPLICATION NO. | : 10/828237 | |
| DATED | : August 22, 2006 | |
| INVENTOR(S) | : Michael Bonaventura Warek | |

It is certified that error appears in the above-identified patent and that said Letters Patent is hereby corrected as shown below:

On the title page, Item (12) change "Bonaventura" to --Warek--.

On the title page, Item (75) Inventor, rewrite as follows:

--Michael Bonaventura Warek, St. Louis, MO (US).--

Signed and Sealed this

Twelfth Day of December, 2006

JON W. DUDAS
*Director of the United States Patent and Trademark Office*